US008646227B2

(12) United States Patent
Zahuranec

(10) Patent No.: US 8,646,227 B2
(45) Date of Patent: Feb. 11, 2014

(54) MASS PRODUCIBLE SOLAR COLLECTOR

(75) Inventor: Terry L. Zahuranec, North Olmsted, OH (US)

(73) Assignee: MH Solar Co., Ltd., Taipei (TW)

( * ) Notice: Subject to any disclaimer, the term of this patent is extended or adjusted under 35 U.S.C. 154(b) by 303 days.

(21) Appl. No.: 12/495,398

(22) Filed: Jun. 30, 2009

(65) Prior Publication Data

US 2010/0000522 A1    Jan. 7, 2010

Related U.S. Application Data

(60) Provisional application No. 61/078,245, filed on Jul. 3, 2008.

(51) Int. Cl.
*E04D 13/18* (2006.01)
*E04H 14/00* (2006.01)

(52) U.S. Cl.
USPC ............................ 52/173.3; 126/571; 126/600

(58) Field of Classification Search
USPC ............................... 52/1, 173.3; 126/571, 600
See application file for complete search history.

(56) References Cited

U.S. PATENT DOCUMENTS

| | | | |
|---|---|---|---|
| 3,696,286 A | 10/1972 | Ule | |
| 3,797,476 A * | 3/1974 | Tarcici | 126/600 |
| 3,985,579 A | 10/1976 | Rahilly | |
| 4,041,307 A | 8/1977 | Napoli et al. | |
| 4,090,070 A | 5/1978 | Colomes | |
| 4,098,264 A | 7/1978 | Brokaw | |
| 4,154,219 A | 5/1979 | Gupta et al. | |
| 4,178,913 A | 12/1979 | Hutchison | |
| 4,202,321 A | 5/1980 | Volna | |
| 4,219,729 A | 8/1980 | Smith | |
| 4,223,214 A | 9/1980 | Dorian et al. | |
| 4,248,643 A | 2/1981 | Peters | |
| 4,249,514 A | 2/1981 | Jones | |
| 4,262,195 A | 4/1981 | White et al. | |
| 4,296,731 A | 10/1981 | Cluff | |
| 4,315,163 A | 2/1982 | Bienville | |

(Continued)

FOREIGN PATENT DOCUMENTS

| | | |
|---|---|---|
| CA | 1 132 869 | 10/1982 |
| CN | 101093114 A | 12/2007 |

(Continued)

OTHER PUBLICATIONS

Building Integrated, Infrastructure, and Utility Scale Solar Power. http://www.power-spar.com/Power-Spar/index.phpwww.powerspar.com. Last accessed Aug. 14, 2009, 1 page.

(Continued)

*Primary Examiner* — Andrew Triggs
(74) *Attorney, Agent, or Firm* — Turocy & Watson, LLP

(57) ABSTRACT

Provided is a solar collector assembly that can be manufactured, assembled, and maintained efficiently. A number of arrays that include one or more reflective material formed in a parabolic shape can be attached to a backbone. The backbone is attached to a polar support that is positioned at or near the center of gravity for the solar collector assembly. The polar support at or near the center of gravity allows the entire assembly to be tilted, rotated and/or lowered for various purposes (e.g., service, maintenance, safety). The solar collector assembly can be transported as modular units and/or in a partially assembled state.

18 Claims, 28 Drawing Sheets

(56) References Cited

U.S. PATENT DOCUMENTS

| | | | |
|---|---|---|---|
| 4,328,789 A | 5/1982 | Nelson | |
| 4,354,484 A | 10/1982 | Malone et al. | |
| 4,364,183 A | 12/1982 | Rhodes | |
| 4,392,008 A | 7/1983 | Cullis | |
| 4,409,422 A | 10/1983 | Sater | |
| 4,445,030 A | 4/1984 | Carlton | |
| 4,496,787 A | 1/1985 | Touchais et al. | |
| 4,501,469 A * | 2/1985 | Merges et al. | 359/849 |
| 4,516,314 A | 5/1985 | Sater | |
| 4,546,756 A | 10/1985 | Leroy et al. | |
| 4,583,520 A * | 4/1986 | Dietrich et al. | 126/606 |
| 4,656,996 A * | 4/1987 | Aharon | 126/600 |
| 4,691,106 A | 9/1987 | Hyun et al. | |
| 4,720,170 A | 1/1988 | Learn, Jr. | |
| 4,771,764 A | 9/1988 | Cluff | |
| 4,836,672 A | 6/1989 | Naiman et al. | |
| 4,883,340 A * | 11/1989 | Dominguez | 359/593 |
| 5,022,929 A | 6/1991 | Gallois-Montbrun | |
| 5,125,743 A | 6/1992 | Rust et al. | |
| 5,187,361 A | 2/1993 | Ishii et al. | |
| 5,223,043 A | 6/1993 | Olson et al. | |
| 5,236,378 A * | 8/1993 | Newman | 440/6 |
| 5,293,447 A | 3/1994 | Fanney | |
| 5,325,844 A * | 7/1994 | Rogers et al. | 126/605 |
| 5,374,939 A | 12/1994 | Pullen, V | |
| 5,416,324 A | 5/1995 | Chun | |
| 5,473,166 A | 12/1995 | Imai et al. | |
| 5,522,944 A | 6/1996 | Elazari | |
| 5,600,124 A * | 2/1997 | Berger | 250/203.4 |
| 5,616,913 A | 4/1997 | Litterst | |
| 5,707,458 A | 1/1998 | Nagashima et al. | |
| 5,758,938 A | 6/1998 | Osterwisch | |
| 5,798,517 A | 8/1998 | Berger | |
| 5,862,799 A | 1/1999 | Yogev et al. | |
| 5,899,071 A | 5/1999 | Stone et al. | |
| 5,964,216 A | 10/1999 | Hoffschmidt et al. | |
| 5,982,481 A | 11/1999 | Stone et al. | |
| 6,005,236 A | 12/1999 | Phelan | |
| 6,018,122 A | 1/2000 | Hibino et al. | |
| 6,018,123 A | 1/2000 | Takada | |
| 6,080,927 A | 6/2000 | Johnson | |
| 6,123,067 A | 9/2000 | Warrick | |
| 6,127,620 A | 10/2000 | Tange et al. | |
| 6,281,426 B1 | 8/2001 | Olson et al. | |
| 6,284,968 B1 | 9/2001 | Niesyn | |
| 6,485,152 B2 | 11/2002 | Wood | |
| 6,583,415 B2 | 6/2003 | Stevens | |
| 6,597,709 B1 | 7/2003 | Diver, Jr. | |
| 6,662,801 B2 * | 12/2003 | Hayden et al. | 126/571 |
| 6,704,607 B2 | 3/2004 | Stone et al. | |
| 6,848,442 B2 * | 2/2005 | Haber | 126/600 |
| 6,936,760 B2 | 8/2005 | Rogers et al. | |
| 6,984,050 B2 * | 1/2006 | Nakamura | 359/853 |
| 7,076,965 B2 | 7/2006 | Lasich | |
| 7,079,317 B2 | 7/2006 | Baun et al. | |
| 7,092,156 B2 | 8/2006 | Baun et al. | |
| 7,109,461 B2 | 9/2006 | Lasich | |
| 7,185,845 B1 | 3/2007 | Hartman et al. | |
| 7,197,829 B2 | 4/2007 | Acres | |
| 7,228,661 B2 * | 6/2007 | Rizzotto | 52/170 |
| 7,253,902 B2 | 8/2007 | Feldman | |
| 7,357,132 B2 * | 4/2008 | Hayden | 126/604 |
| 7,709,730 B2 * | 5/2010 | Johnson et al. | 136/246 |
| 7,825,327 B2 * | 11/2010 | Johnson et al. | 136/246 |
| 7,834,303 B2 | 11/2010 | Fatehi et al. | |
| 7,873,490 B2 | 1/2011 | MacDonald | |
| 8,229,581 B2 | 7/2012 | Zalusky et al. | |
| 8,253,086 B2 | 8/2012 | Zalusky et al. | |
| 2002/0179138 A1 | 12/2002 | Lawheed | |
| 2003/0045949 A1 | 3/2003 | Stone et al. | |
| 2003/0101565 A1* | 6/2003 | Butler | 29/428 |
| 2004/0216777 A1 | 11/2004 | Pan | |
| 2005/0016581 A1 | 1/2005 | Fujisaki et al. | |
| 2005/0109387 A1 | 5/2005 | Marshall | |
| 2007/0034205 A1 | 2/2007 | Watts | |
| 2007/0089774 A1 | 4/2007 | Lasich | |
| 2007/0095341 A1 | 5/2007 | Kaneff | |
| 2007/0145252 A1 | 6/2007 | Litchfield et al. | |
| 2007/0150198 A1 | 6/2007 | MacDonald | |
| 2007/0151245 A1 | 7/2007 | Coffey et al. | |
| 2007/0215198 A1 | 9/2007 | Jiang et al. | |
| 2007/0227574 A1 | 10/2007 | Cart | |
| 2007/0251564 A1 | 11/2007 | Smith | |
| 2007/0251569 A1 | 11/2007 | Shan et al. | |
| 2008/0011288 A1 | 1/2008 | Olsson | |
| 2008/0017784 A1 | 1/2008 | Hoot et al. | |
| 2008/0040990 A1 | 2/2008 | Vendig et al. | |
| 2008/0087318 A1 | 4/2008 | Jwo | |
| 2008/0128559 A1 | 6/2008 | Ho et al. | |
| 2009/0056699 A1 | 3/2009 | Mills et al. | |
| 2009/0114211 A1 | 5/2009 | Homyk et al. | |
| 2009/0126774 A1 | 5/2009 | Taylor et al. | |
| 2009/0205637 A1 | 8/2009 | Moore et al. | |
| 2009/0293861 A1 | 12/2009 | Taylor et al. | |
| 2010/0000519 A1* | 1/2010 | Zalusky et al. | 126/601 |
| 2010/0000522 A1* | 1/2010 | Zahuranec | 126/696 |
| 2010/0006139 A1* | 1/2010 | Zahuranec et al. | 136/246 |
| 2010/0263659 A9 | 10/2010 | Taylor et al. | |
| 2011/0048403 A1 | 3/2011 | Stavrou et al. | |

FOREIGN PATENT DOCUMENTS

| | | |
|---|---|---|
| EP | 1919029 | 5/2008 |
| ES | 2114826 | 6/1998 |
| ES | 2114826 A1 | 6/1998 |
| GB | 2 426 324 A | 11/2006 |
| JP | 62166110 | 7/1987 |
| JP | 63096447 A | 4/1988 |
| JP | 7 038 131 A | 2/1995 |
| JP | 8130322 | 5/1996 |
| JP | 200153322 | 2/2001 |
| JP | 2004-312054 A | 11/2004 |
| JP | 2005018352 A | 1/2005 |
| JP | 2005038270 | 2/2005 |
| KR | 100343263 B1 | 6/2002 |
| WO | 2008003023 | 1/2008 |
| WO | 2008013976 A2 | 1/2008 |
| WO | 2008117297 A2 | 10/2008 |

OTHER PUBLICATIONS

Sater, et al. High Voltage Silicon VMJ Solar Cells for up to 1000 Suns Intensities. Photovoltaic Specialists Conference 2002. Conference Record of the Twenty-Ninth IEEE, May 19-24, 2002, pp. 1019-1022. Last accessed Oct. 1, 2009, 4 pages.

Written Opinion and International Search Report mailed Nov. 10, 2009 for PCT Application No. PCT/US 09/49610, 25 pages.

OA dated Apr. 28, 2011 for U.S. Appl. No. 12/495,164, 33 pages.

OA mailed Oct. 17, 2011 for U.S. Appl. No. 12/495,164, 16 pages.

The Fredericks Company. "Electrolytic Tilt Sensor Selection and Operation" published on the Internet at [http://www.frederickscom.com/sens_tech_select.tpl], retrieved Oct. 8, 2011, 3 pages.

The Fredericks Company. "TrueTILT Wide Range" published on the Internet at [http://www.frederickscom.com/sens_tilt_0717_4304.tpl], retrieved Oct. 8, 2011, 1 page.

The Fredericks Company, "0717-4304-99 TrueTilt, Dual Axis, Wide Angle, Electrolytic Tilt Sensor" published on the Internet at [http://www.frederickscom.com/pdf/0717-4304.pdf], retrieved Oct. 8, 2011, 2 pages.

Australian Office Action mailed Oct. 18, 2011 for AU Application No. 2009266870, 3 pages.

OA dated Dec. 22, 2011 for U.S. Appl. No. 12/496,034, 35 pages.

OA dated Nov. 14, 2011 for U.S. Appl. No. 12/496,150, 36 pages.

OA dated Nov. 4, 2011 for U.S. Appl. No. 12/496,541, 48 pages.

OA dated Aug. 31, 2012 for U.S. Appl. No. 12/495,136, 13 pages.

OA dated Jun. 22, 2012 for U.S. Appl. No. 12/496,150, 38 pages.

OA dated Jun. 19, 2012 for U.S. Appl. No. 12/496,541, 26 pages.

OA dated Jun. 28, 2012 for U.S. Appl. No. 12/495,303, 70 pages.

(56) References Cited

OTHER PUBLICATIONS

Notice of allowance dated Mar. 23, 2012 for U.S. Appl. No. 12/495,164, 36 pages.
Non-Final Office Action dated Mar. 30, 2012 for U.S. Appl. No. 12/495,136, 41 pages.
Final Office Action dated Mar. 1, 2012 for U.S. Appl. No. 12/496,541, 31 pages.
English translation of Mexican OA mailed Dec. 27, 2012 for Mexican Patent Application No. MX/a/2011/000201, 3 pages.
Australian Office Action dated Oct. 26, 2012 for Australian Patent Application No. 2009266870, 4 pages.
Australian Office Action dated Feb. 26, 2013 for Australian Patent Application No. 2009266870, 3 pages.
Office Action dated May 23, 2013 for U.S. Appl. No. 12/495,303, 73 pages.

* cited by examiner

MASS PRODUCIBLE SOLAR COLLECTOR

CROSS-REFERENCE

This application claims the benefit of U.S. Provisional Application Ser. No. 61/078,245, filed Jul. 3, 2008, entitled "MASS PRODUCIBLE SOLAR COLLECTOR," and assigned to the assignee hereof and the entirety of which is incorporated herein by reference.

BACKGROUND

Limited supplies of fossil energy resources and associated global environmental damage have compelled market forces to diversify energy resources and related technologies. One such resource that has received attention is solar energy, which employs photovoltaic (PV) technology to convert light into electricity.

PV elements for converting light to electric energy are often applied as solar cells to power supplies for small power in consumer-oriented products (e.g., desktop calculators, watches, and the like). Such systems are drawing attention as to their practicality for future alternate power of fossil fuels. In general, PV elements are elements that employ the photoelectromotive force (photovoltage) of the p-n junction, the Schottky junction, or semiconductors, in which the semiconductor of silicon, or the like, absorbs light to generate photocarriers such as electrons and holes, and the photocarriers drift outside due to an internal electric field of the p-n junction part.

One common PV element employs single-crystal silicon and semiconductor processes for production. For example, a crystal growth process prepares a single crystal of silicon valency-controlled in the p-type or in the n-type, wherein such single crystal is subsequently sliced into silicon wafers to achieve desired thicknesses. Furthermore, the p-n junction can be prepared by forming layers of different conduction types, such as diffusion of a valance controller to make the conduction type opposite to that of a wafer.

In addition to consumer-oriented products, solar energy collection systems are employed for a variety of purposes such as utility interactive power systems, power supplies for remote or unmanned sites, and cellular phone switch-site power supplies, among others. An array of energy conversion modules (such as PV modules) in a solar energy collection system can have a capacity from a few kilowatts to a hundred kilowatts or more, depending upon the number of PV modules, also known as solar panels, used to form the array.

For systems that concentrate light onto a receiver with photovoltaic cells for electricity generation or heat collection, a parabolic reflector is a technique that is utilized to achieve light concentration. Parabolic reflectors, formed in one dimension or two dimensions, are sometimes manufactured by pre-shaping or molding glass, plastic, or metal into a parabolic shape, which can be expensive. An alternative method is to form semi-parabolic reflectors attached to a frame made from bent aluminum tubing or other similar structures. In these and other conventional designs, the complexity of the structure limits mass production and ease of assembly of the design into a solar collector. In many cases, a crane is needed to assemble the structures and, as such, the assembly costs are high. Likewise, alignment of the mirrors can be difficult in the field. Further, the assembly itself can be difficult to service and maintain.

SUMMARY

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

In accordance with one or more features and corresponding disclosure thereof, various aspects are described in connection with simplifying production, shipment, assembly, and maintenance of solar collectors. The disclosed aspects relate to an inexpensive and simplified manner of producing solar collectors and solar collector assemblies that are easily assembled. Further, the aspects disclosed herein allow for inexpensive shipment of a large number of dishes (e.g., solar assemblies) in a modular and/or partially assembled state.

Aspects relate to the manner in which the mirrors are formed into a parabolic shape, held in position, and assembled. Spacing is maintained between mirror wing assemblies to mitigate the effect wind forces can have on the collector during periods of high winds (e.g., storm). The mirror wing assemblies are mounted to a backbone in such a manner that some flexibility is allowed so that the unit moves slightly in response to forces of the wind. However, the unit retains rigidity to maintain the focus of sunlight on the receivers. In accordance with some aspects, the mirror wing assemblies can be arranged as a trough design. Further, the positioning of a polar mount at or near a center of gravity allows movement of the collector for ease of service, storage, or the like.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

According to an aspect is a solar collector that comprises at least four arrays attached to a backbone support. Each array can comprise at least one reflective surface. Solar collector also includes a polar mount on which the backbone support and the at least four arrays can be tilted, rotated or lowered. The polar mount can be positioned at or near a center of gravity. Further, solar collector can include a polar mount support arm operatively connected to a movable mount and a fixed mount. The polar mount support arm can be removed from the movable mount for lowering of the solar collector. The backbone support can comprise a collection apparatus that comprises a plurality of photovoltaic cells that are utilized to facilitate a transformation of solar energy to electrical energy. Each of the at least four arrays comprise a plurality of solar wings formed in parabolic shape, each solar wing comprises a plurality of support ribs. Further, solar collector can include a positioning device that rotates the at least four arrays about a vertical axis.

According to another aspect is a solar wing assembly that comprises a plurality of mirror support ribs operatively attached to a shaped beam and a mirror placed on the plurality of mirror support ribs and secured to the shaped beam. Pairs of the plurality of mirror support ribs can be the same size to form a parabolic shape. Further, solar wing assembly can comprise a plurality of mirror clips that secure the mirror to the shaped beam.

Figure 1:
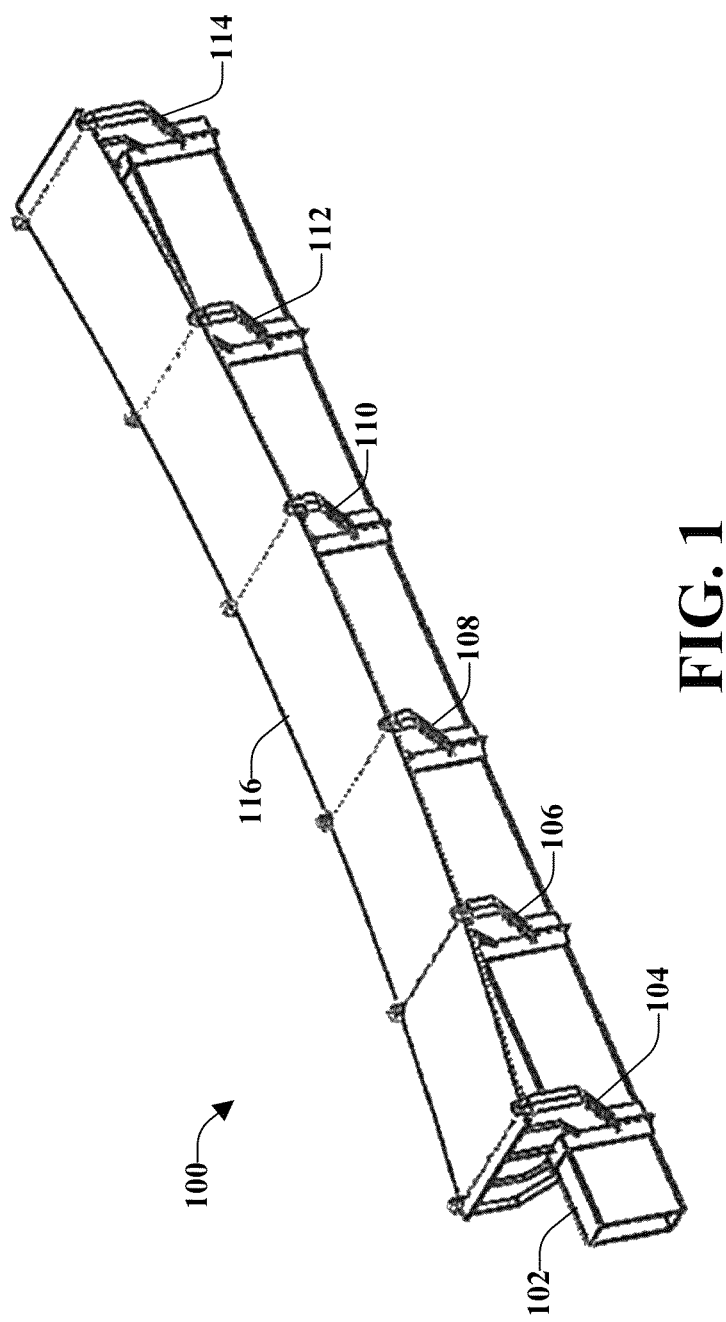
FIG. 1 illustrates a solar wing assembly that is simplified as compared to conventional solar collector assemblies, according to an aspect.

Referring initially to FIG. 1, illustrated is a solar wing assembly 100 that is simplified as compared to conventional solar collector assemblies, according to an aspect. The solar wing assembly 100 utilizes a shaped beam 102, which can be rectangular, as illustrated. In accordance with some aspects, the shaped beam can be other geometric shapes (e.g., square, oval, round, triangular, and so forth). A multiple of formed mirror support ribs 104, 106, 108, 110, 112, and 114 are operatively attached to the shaped beam 102. The mirror support ribs 104-114 can be of any suitable material, such as plastic (e.g., plastic injection molded), formed metal, and so forth.

The mirror support ribs 104-114 can be operatively attached to the shaped beam 102 in various manners. For example, each mirror support rib 104, 106, 108, 110, 112, and 114 can include a clip assembly, which can allow each mirror support rib 104, 106, 108, 110, 112, and 114 to be clipped onto the shaped beam 102. However, other techniques for attaching the mirror support ribs to the shaped beam 102 can be utilized, such as sliding the mirror under the mirror support ribs and securing the mirror in place with hooks or other securing components. In accordance with some aspects, the shaped beam 102 and the mirror support ribs 104, 106, 108, 110, 112, and 114 can be constructed as a single assembly.

Pairs of the mirror support ribs 104-114 can be of a similar size in order to form (and hold) a mirror 116 into a parabolic shape. The term "size" refers to the overall height of each mirror support rib 104, 106, 108, 110, 112, and 114 from the shaped beam 102 to the mirror contact surface. Further, the size or height of each pair of mirror support ribs is of a different height than the other pairs (e.g., the height of a middle support rib is shorter than the height of a support rib at either end of the shaped beam).

The distance from the mirror 116 to the shaped beam 102 can be different at various locations as a function of the overall height of each mirror support rib 104, 106, 108, 110, 112, and 114. Each pair of mirror support ribs are spaced and affixed at varying positions along the beam to achieve a desired parabolic shape. For example, a first pair comprises mirror support rib 108 and mirror support rib 110. A second pair comprises mirror support rib 106 and mirror support rib 112 and a third pair comprises mirror support rib 104 and mirror support rib 114. The first pair of support ribs 108 and 110 has a first height, the second pair of mirror support ribs 106 and 112 has a second height, and the third pair of mirror support ribs 104 and 114 has a third height. In this example, the third height is taller than the second height, and the second height is taller than the first height. Thus, a first pair (e.g., mirror support ribs 108 and 110) holds the mirror 116 at a position that is closer to the shaped beam 102 than the position at which second pair (e.g., mirror support ribs 106 and 112) hold the mirror, which is further away from shaped beam 102, and so forth.

In accordance with some aspects, the mirror support ribs 104-114 can be placed onto the shaped beam 102 at a first end and can be slid or moved along the shaped beam 102 and placed in position. According to other aspects, the mirror support ribs 104-114 can be attached to the shaped beam 102 in other manners (e.g., snapped into place, locked into place, and so forth).

Figure 2:
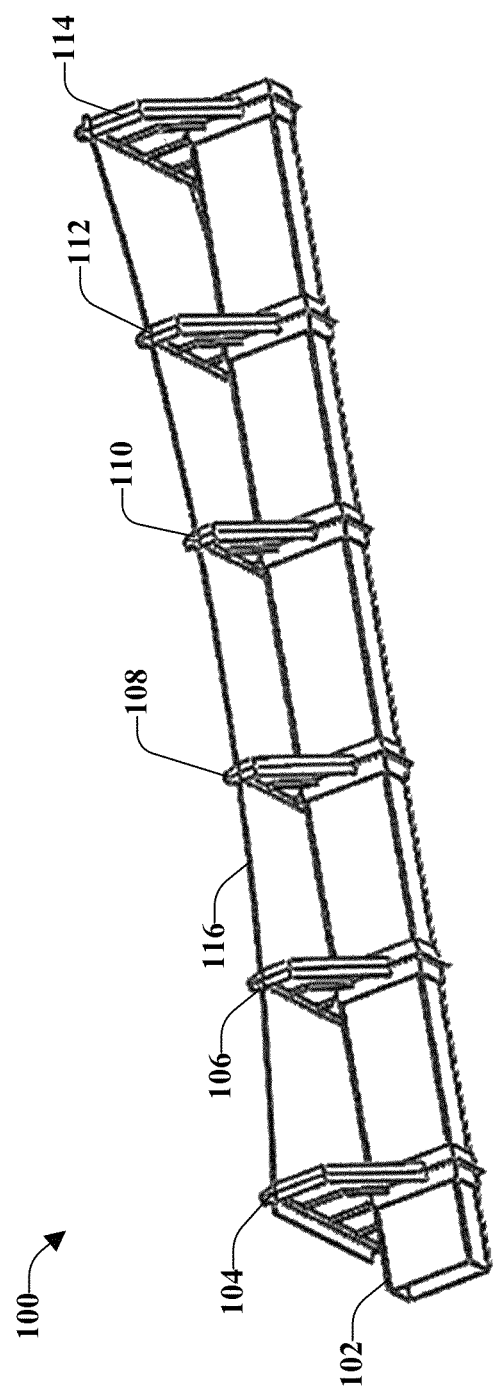
FIG. 2 illustrates another view of the solar wing assembly of FIG. 1, in accordance with an aspect.

FIG. 2 illustrates another view of the solar wing assembly of FIG. 1, in accordance with an aspect. As illustrated, solar wing assembly 100 includes a shaped beam 102 and a multitude of support ribs attached to shaped beam 102. Illustrated are six mirror support ribs 104, 106, 108, 110, 112, and 114. However, it should be understood that more or fewer support ribs could be utilized with the disclosed aspects. Operatively connected to each support rib 104-114 is a mirror 116, which will be discussed in further detail below.

Figure 3:
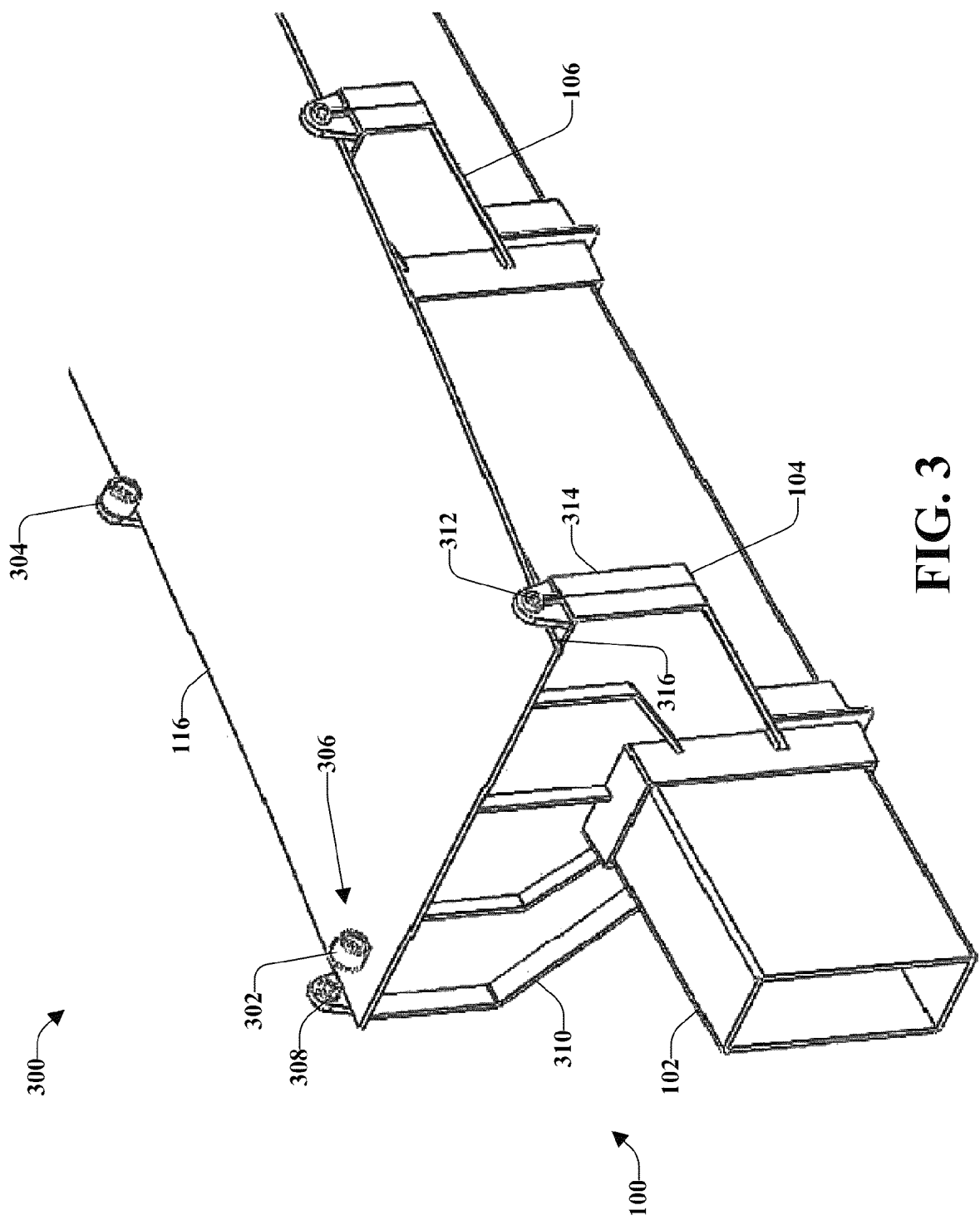
FIG. 3 illustrates an example schematic representation of a portion of a solar wing assembly with a mirror in a partially unsecure position, according to an aspect
Figure 4:
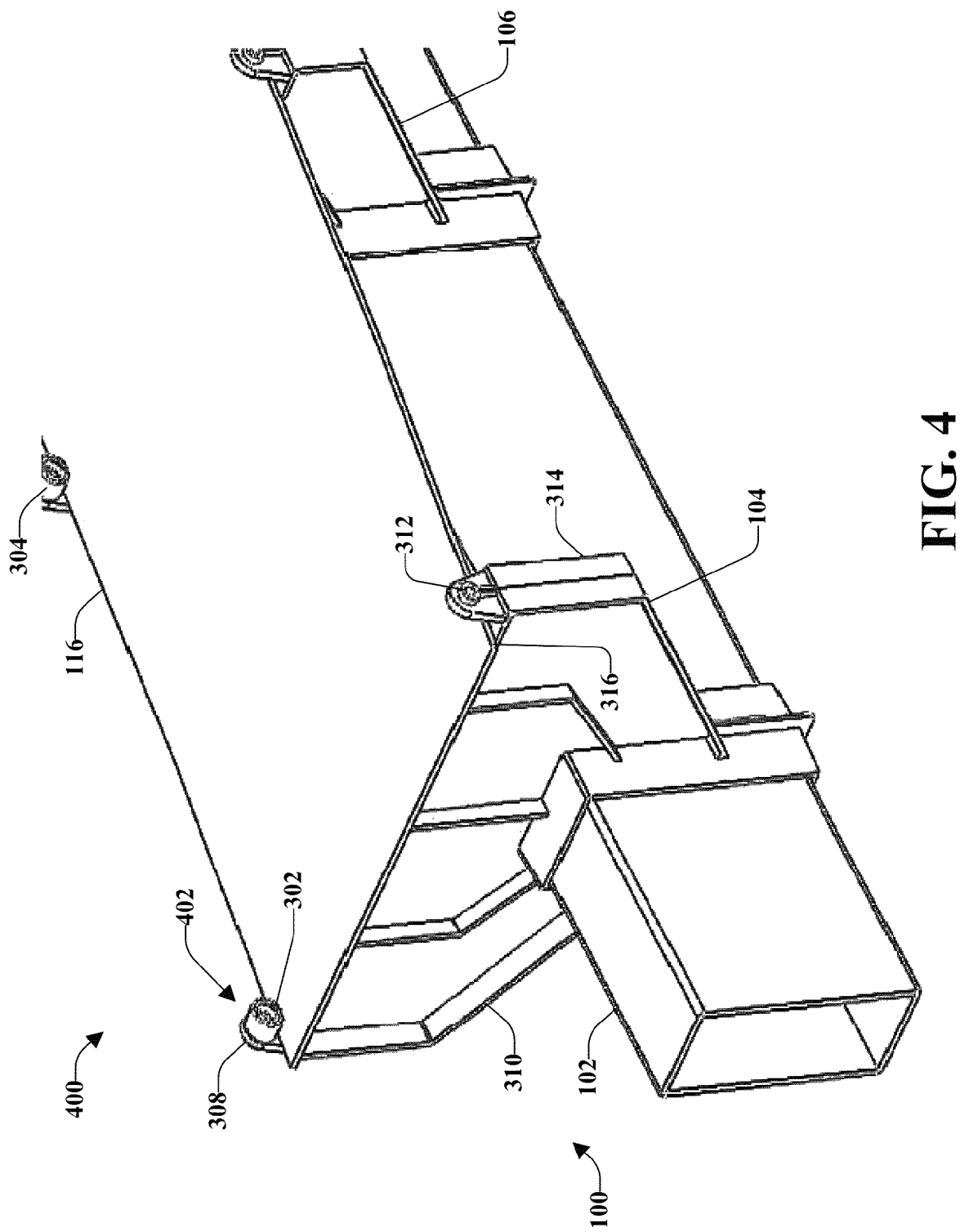
FIG. 4 illustrates an example schematic representation of a portion of a solar wing assembly with a mirror in a secure position, according to an aspect.

FIG. 3 illustrates an example schematic representation 300 of a portion of a solar wing assembly 100 with a mirror 116 in a partially unsecure position, according to an aspect. FIG. 4 illustrates an example schematic representation 400 of a portion of a solar wing assembly 100 with a mirror 116 in a secure position, according to an aspect. For ease of explanation and understanding, FIG. 3 and FIG. 4 will be discussed together.

As illustrated, the portion of the solar wing assembly 100 includes a shaped beam 102. Mirror support rib 104 and mirror support rib 106 (as well as other mirror support ribs) are operatively connected to shaped beam 102. Further, a mirror 116 is operatively connected to mirror support rib 104 and mirror support rib 106.

The mirror 116, which comprises reflective mirror material, can be supplied in a flat condition. In order to shape the mirror 116 into a parabolic shape, the mirror 116 can be placed on the top of each mirror support rib 104 and 106 (and so on). A mirror clip 302 can hold the mirror 116 against mirror support rib 104 and mirror clip 304 can hold the mirror 116 against mirror support rib 106. Only one mirror clip 302, 304 for each mirror support rib 104, 106 are illustrated in FIG. 3 and FIG. 4. However, it should be understood that each mirror support rib could include two (or more) mirror clips.

The mirror clip 302 can be positioned over the mirror 116 at a first position 306 (as illustrated in FIG. 3). In order to lock the mirror 116 against the mirror support rib 104, the mirror clip 302 is moved to a second position 402 (as illustrated in FIG. 4) and operatively engaged with the mirror support rib 104. The mirror 116 is operatively engaged with each mirror support rib 104-114 along the length of the shaped beam 102 in a similar manner (e.g., as illustrated by mirror clip 304).

The mirror clips (e.g., mirror clip 302) are illustrated as a donut shape with an opening in the middle (e.g., female connector), allowing the mirror clip 302 to engage with a male connector 308 located at a first side 310 of the mirror support rib 104. A second mirror clip (not shown) can be engage with a male connector 312, located on a second side 314 of the mirror support rib 104. It should be understood that while a female connector is associated with the mirror clip 302 and a male connector 308, 312 is described with reference to the mirror support rib 104, the disclosed aspects are not so limited. For example, the mirror clip 302 can be a male connector. In accordance with some aspects, the mirror clip 302 can be either a male connector or a female connector, provided that mirror clip 302 can be operatively engaged to the mirror support rib 104 (e.g., the mirror support rib 104 provides the mating connector).

It should be understood that the mirror clip 302 is not limited to the design illustrated and described as other clips can be utilized, provided the mirror 116 is securely engaged with each mirror support rib 104-114. Securing the mirror 116 against each mirror support rib 104-114 can help enable that the mirror 116 does not come detached from the mirror support ribs 104-114 during shipment, assembly, or use of a collector assembly that utilizes one or more solar wing assemblies. It should be understood that any fastener could be utilized to secure the mirror 116 to the mirror support rib 104 and the fasteners shown and described are for example purposes.

In accordance with some aspects, the mirror clips 302, 304 are configured such that there is no rotation of the mirror clips 302, 304. For example, a nut and screw combination can be utilized, wherein screws protrude over a mirror contact surface 316, which runs the length of the mirror support rib 104 from the connector 308 to connector 312, for example. According to some aspects, the mirror clips 302, 304 can include anti-rotation features such that once placed in position, the mirror clips 302, 304 do not move (except from the first position 306 to the second position 402 and vice versa).

In accordance with some aspects, the size of each mirror clip 302, 304 is a function of the mirror 116 thickness. Since the mirror 116 is locked between the mirror support rib 104 and the mirror clips 302, 304 a thicker mirror 116 would necessitate the use of smaller mirror clips 302, 304. Similarly, a thinner mirror 116 can necessitate the use of larger mirror clips 302, 304 to mitigate the chances that the mirror would slide along the support ribs 104-114. In accordance with some aspects, the size of the mirror clips 302, 304 are a function of whether a mirror with break resistant backing is utilized or if a different type of mirror (e.g., aluminum mirror) is utilized.

Matching the mirror clips 302, 304 to the mirror thickness can further help enable that the mirror 116 does not fluctuate its position between the support ribs 104-114 and the mirror clips 302, 304. If the mirror 116 fluctuates (e.g., moves), it can lead to breakage of the mirror 116 during shipment, assembly in the field, or while a solar collector assembly that employs one or more solar wing assemblies 100 is in use (e.g., lowering the wings of the solar collector assembly, rotating the assembly, tiling the assembly, and so forth), as will be described in more detail below.

With reference again to FIG. 1, a collection of solar wing assemblies 100 can be utilized to form a mirror wing array. For example, seven solar wings assemblies can be placed side-by-side to form a mirror wing array. Four similar mirror wing arrays (each containing seven solar wing assemblies 100, for example) can form a solar collector assembly. However, it should be understood that more or fewer solar wing assemblies 100 can be utilized to form a mirror wing array and any number of mirror wing arrays can be utilized to form a solar collection assembly and the examples shown and described are for purposes of simplicity. Further information about the construction of an entire solar collection assembly will be described more fully with respect to the following figures.

Figure 5:
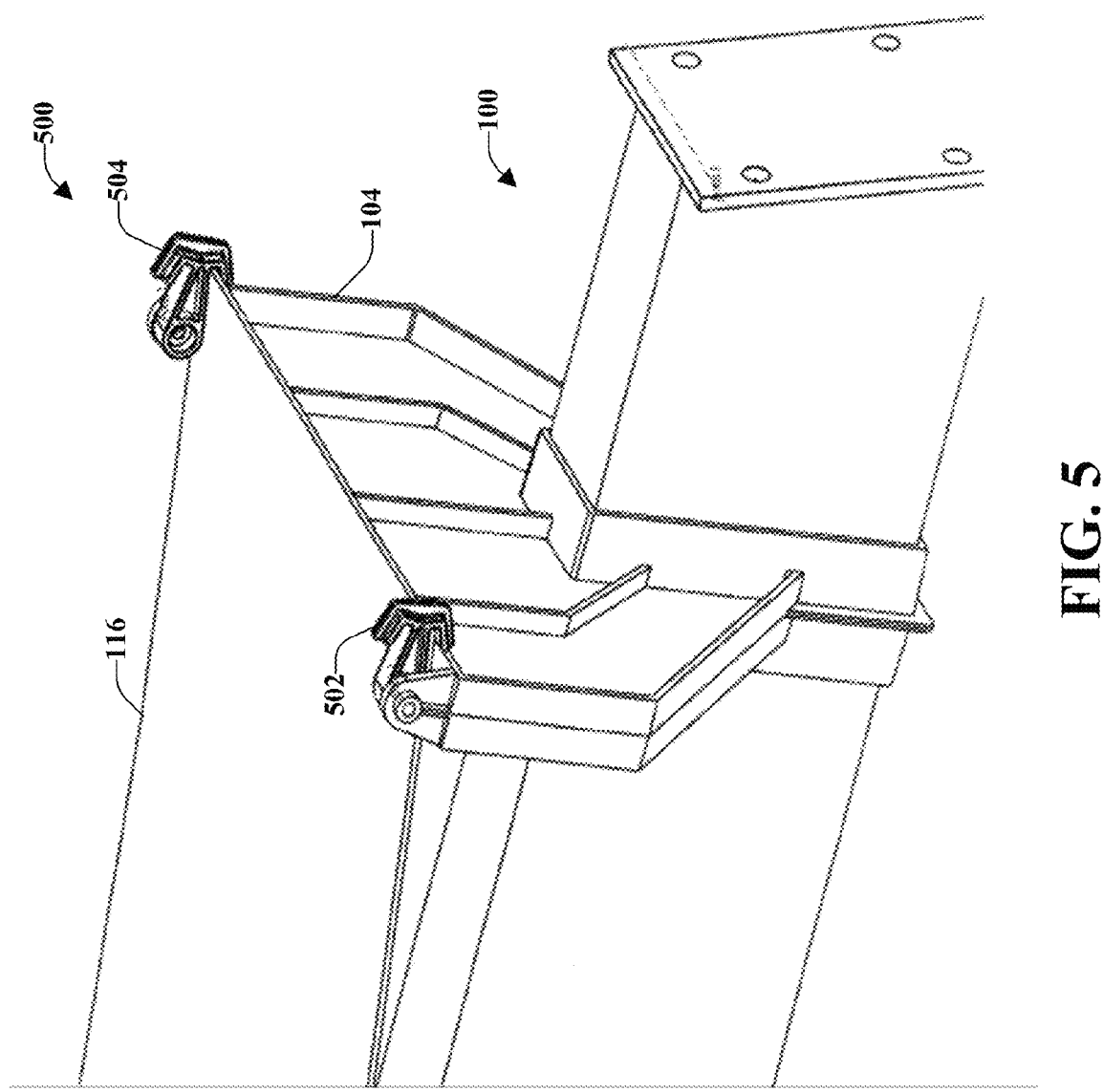
FIG. 5 illustrates another example schematic representation of a portion of a solar wing assembly in accordance with an aspect.

FIG. 5 illustrates another example schematic representation 500 of a portion of a solar wing assembly 100 in accordance with an aspect. In this example, two hooks 502 and 504 are utilized to securely engage the mirror 116 against the mirror support ribs (e.g., mirror support rib 104 and mirror support rib 114 of FIGS. 1 and 2). To attach the mirror 116, the mirror can be slid from a first end (e.g., at mirror support rib 104) to a second end (e.g., at mirror support rib 114, illustrated in FIGS. 1 and 2). The mirror 116 can be slid under mirror clips, or stopper clips, associated with the mirror support ribs along the length of the solar wing assembly 100. Sliding the mirror 116 in an end loaded manner can be similar to installing a windshield wiper blade refill on an automobile.

In accordance with some aspects, the mirror clips can be preinstalled. Hooks, similar to hooks 502 and 504, can be located at second end of solar wing assembly 100 (e.g., at mirror support rib 114) and can be utilized to stop the mirror at the desired location. When the mirror 116 is engaged along the length of the solar wing assembly 100, the hooks 502 and 504 can be utilized to secure the mirror in position.

Figure 6:
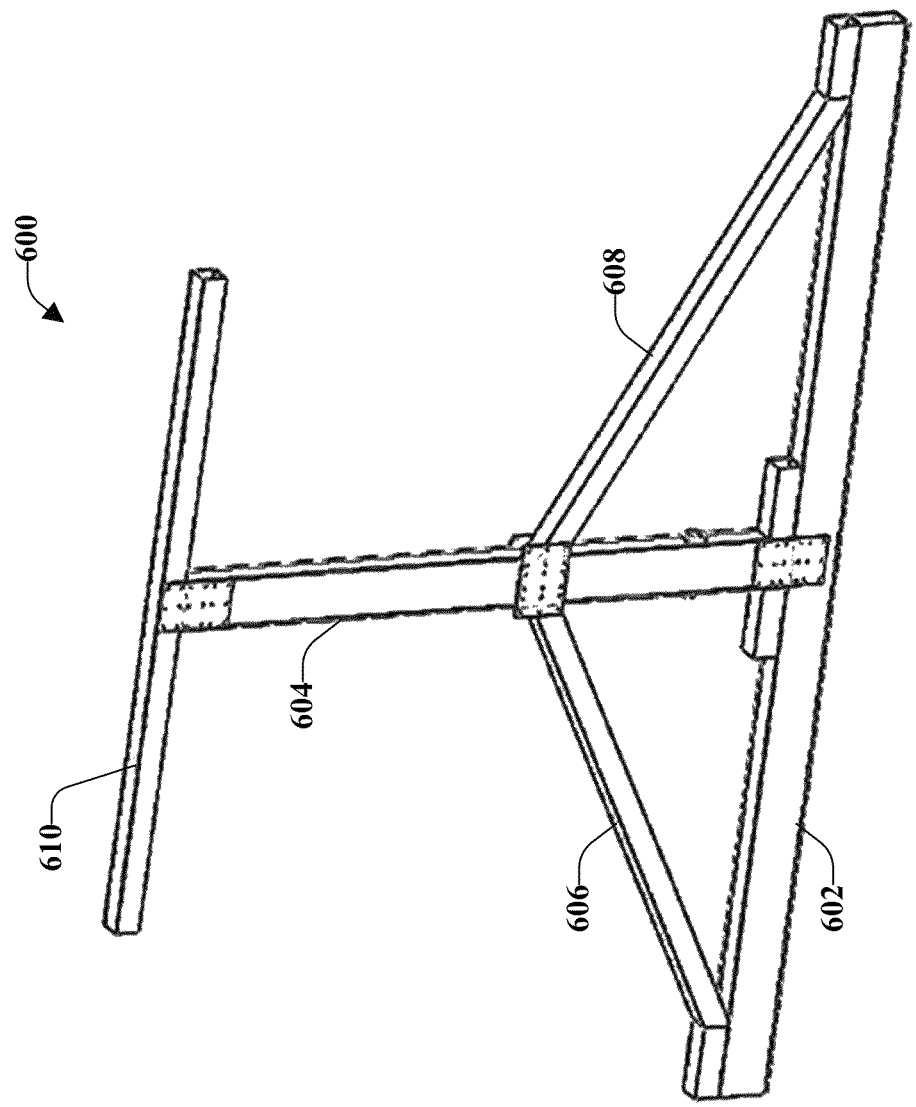
FIG. 6 illustrates a backbone structure for a solar collector assembly in accordance with the disclosed aspects.

FIG. 6 illustrates a backbone structure 600 for a solar collector assembly in accordance with the disclosed aspects. As illustrated, the backbone structure 600 can be formed utilizing rectangular beams 602 and 604, two supports 606 and 608, and a central collection apparatus 610. However, it should be understood that other shapes can be utilized for the beams and the disclosed aspects are not limited to rectangular beams. The beams are attached together with plates or are welded to form the backbone structure 600. In accordance with some aspects, common sized plates are used to simplify assembly. The central collection apparatus 610 can comprise photovoltaic cells that are utilized to facilitate the transformation of solar energy to electrical energy.

Figure 7:
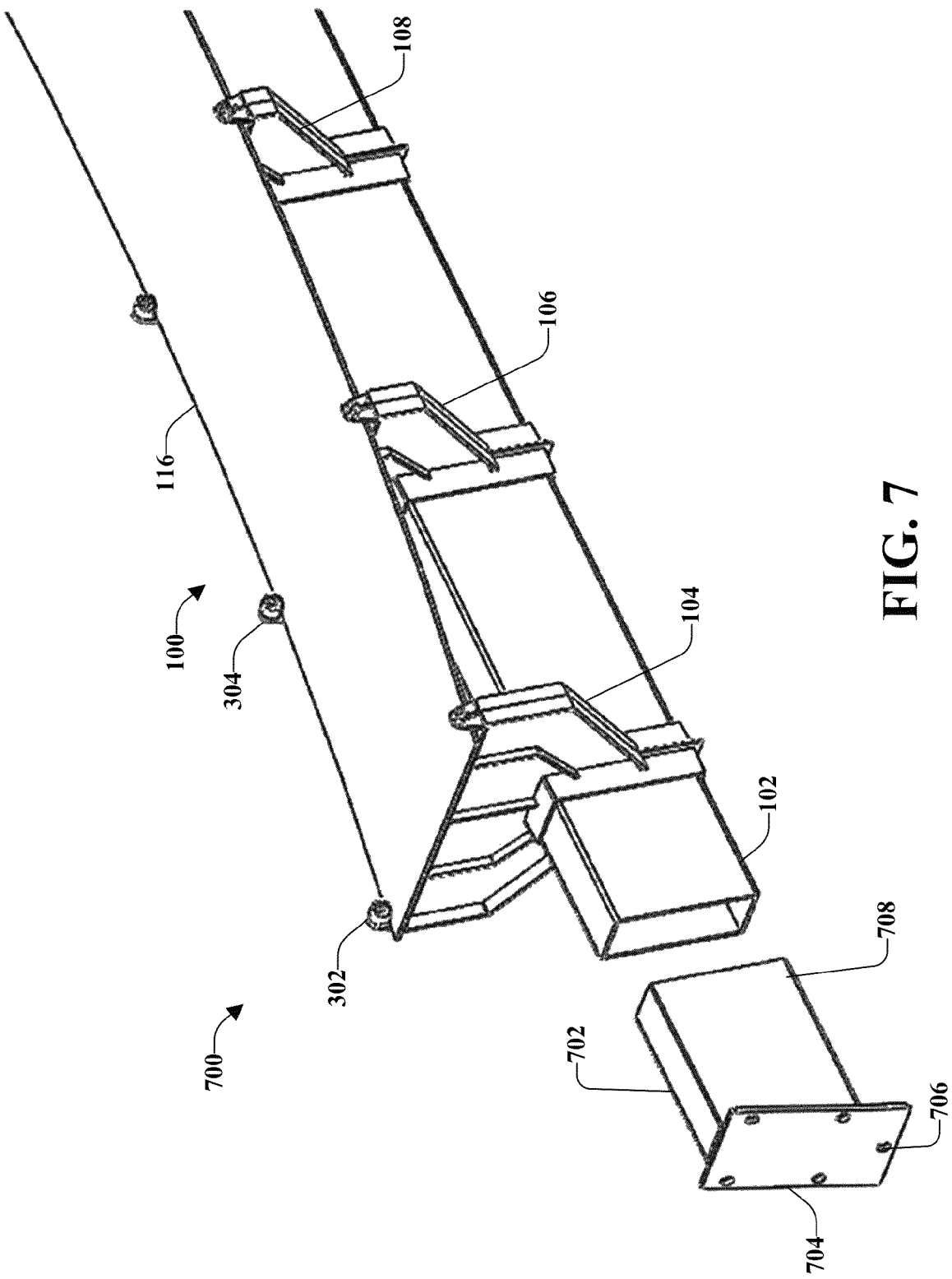
FIG. 7 illustrates a schematic representation of a solar wing assembly and a bracket that can be utilized to attach the solar wing assembly to the backbone structure, according to an aspect.

A multitude of solar wing assemblies 100 can be attached to the backbone structure 600. FIG. 7 illustrates a schematic representation 700 of a solar wing assembly 100 and a bracket 702 that can be utilized to attach the solar wing assembly 100 to the backbone structure 600 (of FIG. 6), according to an aspect. A first end 704 of the bracket 702 can be operatively connected to rectangular beam 602 (of FIG. 6). For example, the first end of bracket 704 can have pilot holes, one of which is labeled at 706, that allow bracket 702 to be connected to rectangular beam 602 with screws or other fastening devices. In accordance with some aspects, bracket 702 is welded to rectangular beam 602.

Solar wing assembly 100 is operatively connected to a second end 708 of bracket 702, which is illustrated as a rectangular beam. Further solar wing assembly 100 can be secured to rectangular beam 602 in such a manner that, as the solar assembly is operated (e.g., lowering the wings of the solar collector assembly, rotating the assembly, tiling the assembly, and so forth) the solar wing assembly 100 does not become disengaged from the backbone structure 600. In accordance with some aspects, simplified gusset mounting of the common wing panels allow for easy field assembly. The main beam can be factory pre-drilled with the gusset mounting holes so no field alignment is necessary. The angle formed in the gusset parts can help to keep the winged panel at the proper angle to the main beam.

Figure 8:
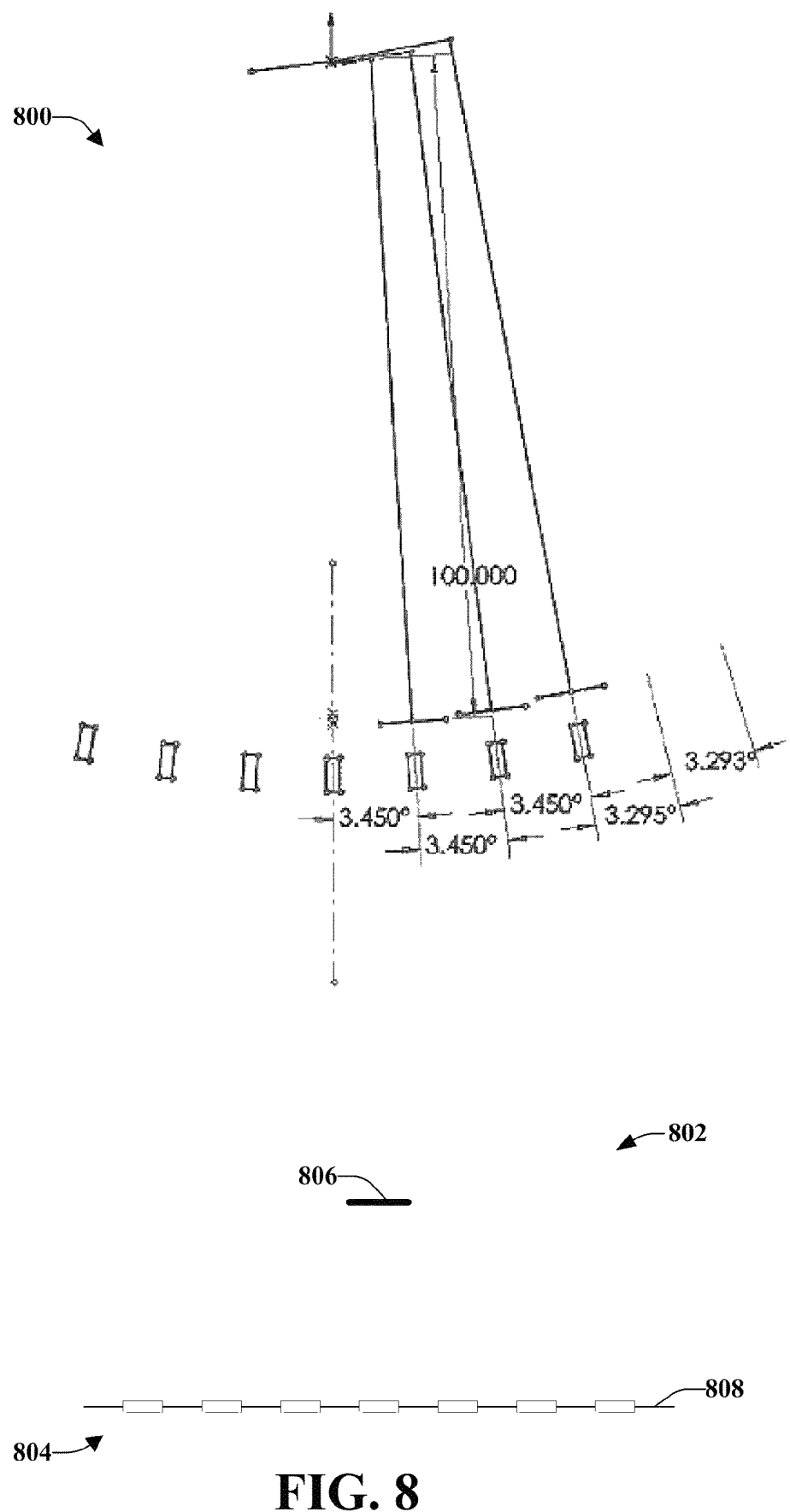
FIG. 8 illustrates a schematic representation of an example focus length that represents an arrangement of the solar wing assemblies to the backbone structure in accordance with an aspect.

FIG. 8 illustrates a schematic representation of an example focus length 800 that represents an arrangement of the solar wing assemblies 100 to the backbone structure 600 in accordance with an aspect. It should be noted that the illustration represents an example of a common focal length mounting pattern of the gussets for the parabolic winged panels and the disclosed aspects are not limited to this mounting pattern.

The solar wing assemblies 100 can be arranged such that each solar wing assembly has substantially the same focus length to the receivers. In accordance with some aspects, one or more receivers can be included. The one or more receivers can include a photovoltaic (PV) module that facilitates energy conversion (light to electricity) and/or that harvests thermal energy (e.g., through a serpentine with a circulating fluid that absorbs heat created at the one or more receivers). According to some aspects, the receiver(s) harvest thermal, PV, or both thermal and PV. It should be noted that the degrees and other measurements illustrated are for example purposes only and the disclosed aspects are not limited to these examples.

Illustrated at 802 is an aspect wherein solar reflectors 804 are operatively connected to a main support beam in a straight-line configuration or a trough design. In this aspect, the receivers are not necessarily at a similar focal distance from a receiver 806. As illustrated, line 808 indicates an attachment line on a support frame.

Figure 9:
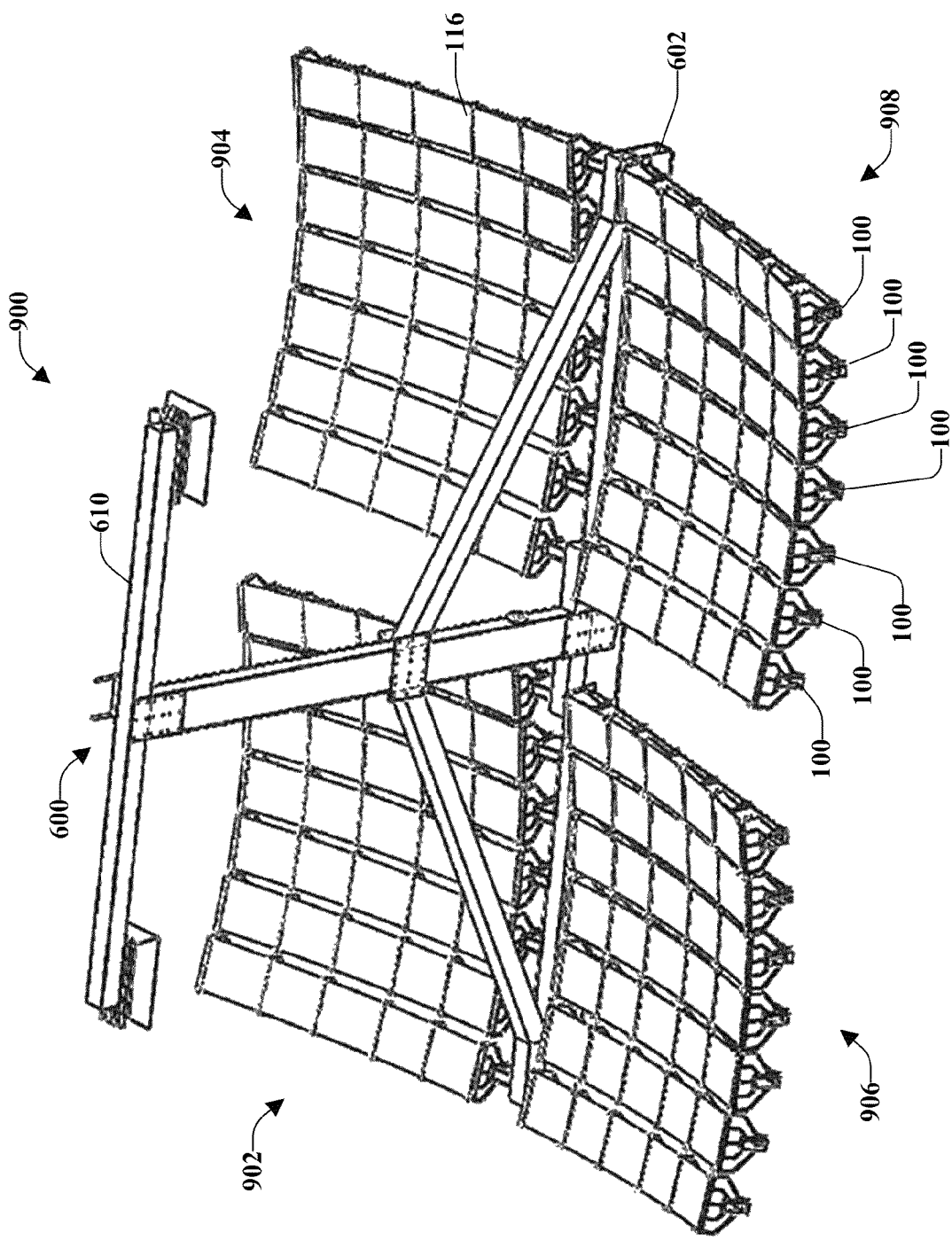
FIG. 9 illustrates a schematic representation of a solar collection assembly that utilizes four arrays comprising a multitude of solar wing assemblies, according to an aspect.

With reference now to FIG. 9, illustrated is a schematic illustration of a solar collection assembly 900 that utilizes four arrays 902, 904, 906, and 908 comprising a multitude of solar wing assemblies 100, according to an aspect. Each array 902, 904, 906, 908 can include, for example, seven solar wing assemblies 100 arranged lateral to each other. For example, there are seven solar wing assemblies 100 in array 908, as labeled. Each array 902, 904, 906, 908 can be attached to backbone structure 600, and more specifically, to rectangular beam 602. In accordance with some aspects, more or fewer solar wing assemblies 100 can be utilized to form an array 902, 904, 906, or 908 and more or fewer arrays 902-908 can be utilized to form a solar collection assembly 900 and the disclosed aspects are not limited to four such assemblies.

Figure 10:
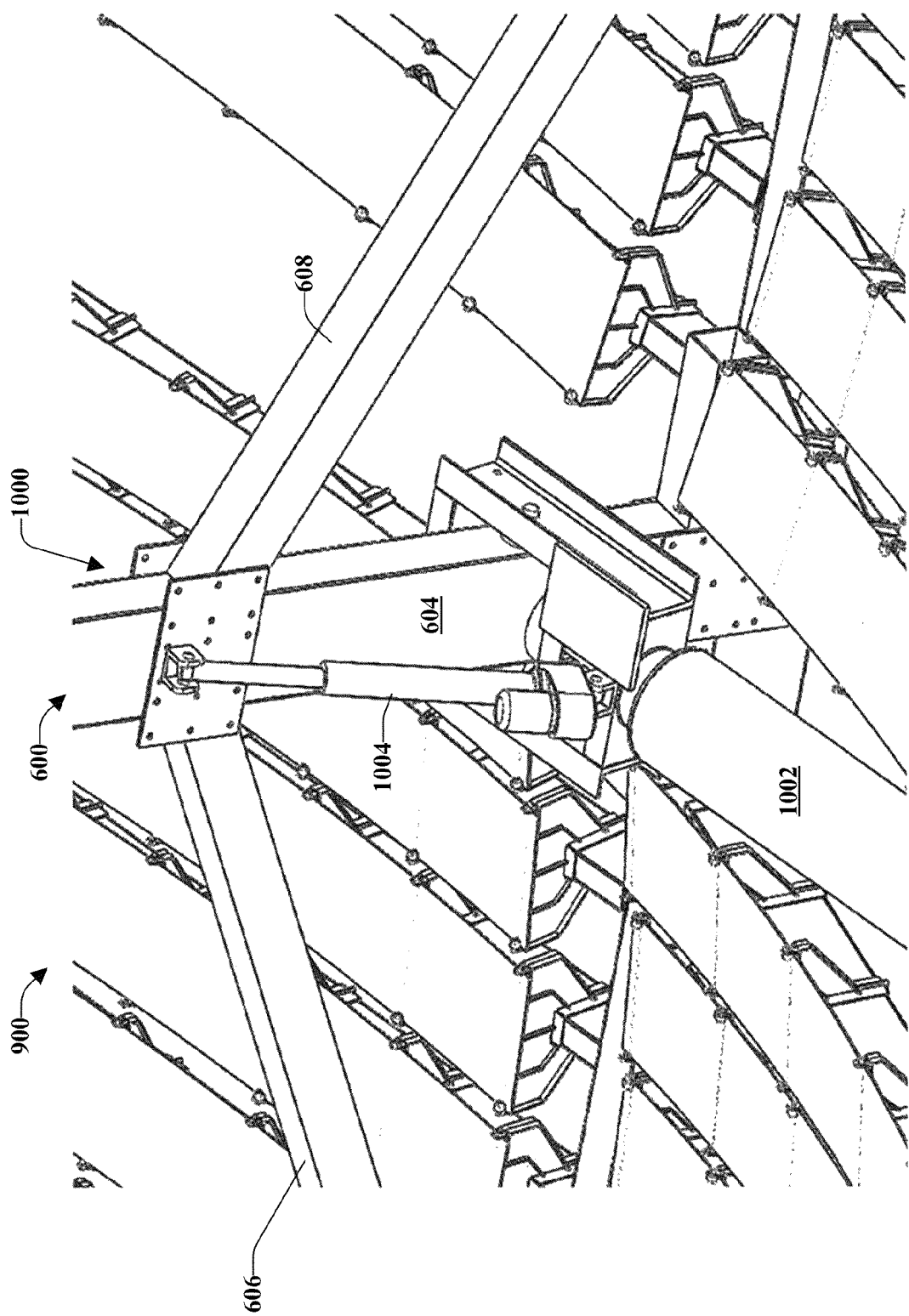
FIG. 10 illustrates a simplified polar mount that can be utilized with the disclosed aspects.

Solar collection assembly 900 can have a balanced center of gravity located on a receiver mast (not illustrated) about which the solar collection assembly 900 can be tilted or rotated. FIG. 10 illustrates a simplified polar mount 1000 that can be utilized with the disclosed aspects. A center of gravity can be utilized as a mounting point for the solar collection assembly 900 (of FIG. 9) on the simplified polar mount 1000. The positioning of the polar mount 1000 at this center of gravity allows movement of the collector for ease of usage, service, storage, or the like.

For example, the solar collection assembly 900 can be tiled through a declination axis in relation to a polar mount support arm 1002. The polar mount support arm 1002 can be aligned to the earth's surface such that the polar mount support arm 1002 is aligned parallel with the tilt of the earth's axis of rotation, which will be discussed in further detail below. A positioning device 1004, such as an actuator, is operatively connected to a positioning assembly 1006 and rectangular beam 604 of backbone structure 600. The positioning device 1004 facilitates the solar collection assembly 900 to be rotated about a vertical axis (which is also known as the declination axis). The positioning device 1004 can be, for example, an actuation cylinder (e.g., hydraulic, pneumatic, and so forth).

The positioning assembly 1006 facilitates rotating the solar collection assembly 900 about the ascension axis of the polar mount support arm 1002. The positioning device 1004 can tilt the solar collection assembly 900 to a desired angle of declination with respect to the sun's position in the sky, as the positioning device 1004 moves in relation to the positioning assembly 1006, supports 606 and 608 also move causing the solar collection assembly 900 to tilt through a range of declination angles.

As the positioning assembly 1006 is rotated to track the ascension of the sun, the positioning device 1004 can be utilized to enable that that the solar collection assembly 900 remains at an optimal angle of declination to capture the sun's rays. Use of a positioning device 1004 in conjunction with the polar mount 1000 allows the solar collection assembly 900 to be adjusted to a desired declination angle at the commencement of solar collection as opposed to continually having to adjust the angle of tilt throughout the sun tracking process. This can mitigate the energy consumption associated with operating a solar collection assembly since the positioning device 1004 only needs to be adjusted once per day (or as many times per day, as needed, so as to provide an optimal tacking of the sun) as opposed to conventional techniques that continually adjust the positioning device 1004.

Figure 11:
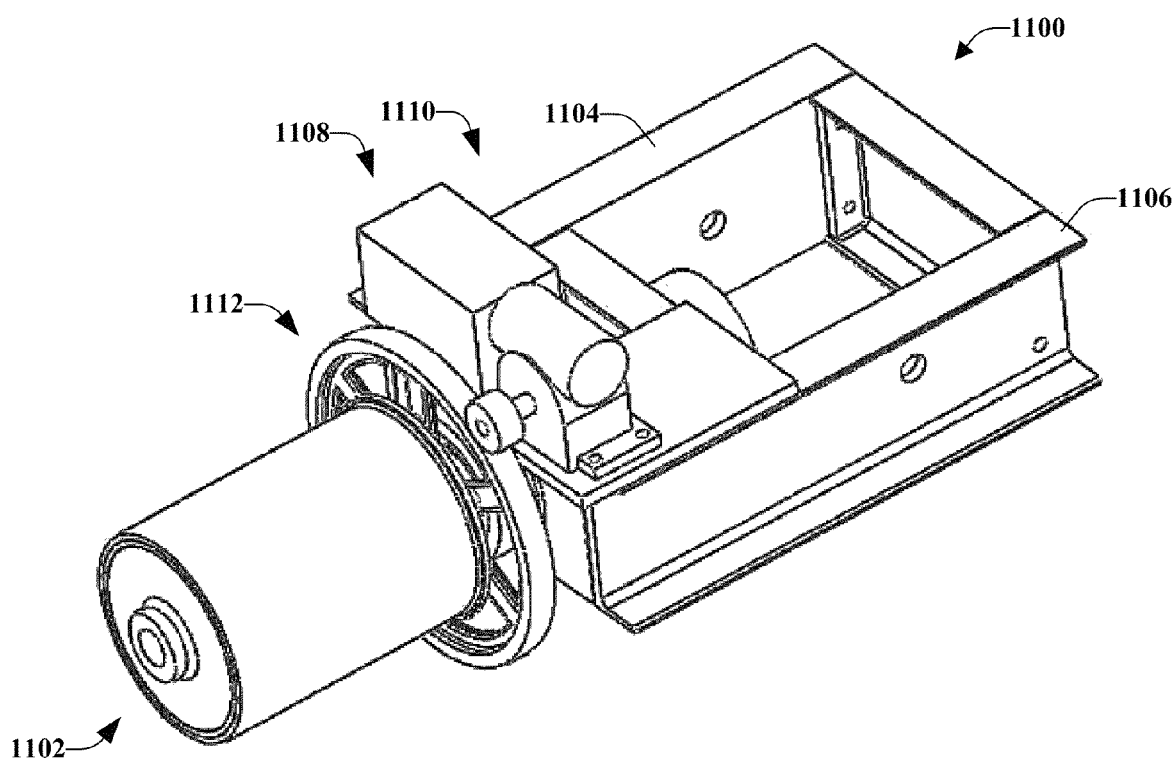
FIG. 11 illustrates an example motor gear arrangement that can be utilized to control rotation of a solar collector assembly, according to an aspect.

Referring now to FIG. 11, illustrated is an example motor gear arrangement 1100 that can be utilized to control rotation of a solar collector assembly, according to an aspect. Motor gear arrangement 1100 can be utilized to, at least partially, connect a solar collection assembly 900 (of FIG. 9) to a polar mount support arm 1002 (of FIG. 10). Motor gear arrangement 1100 can rotate the solar collection assembly 900 about a central axis of the polar mount support arm 1002, which provides ascension positioning of the array. Motor gear arrangement 1100 comprises a connector 1102 that can be utilized to operatively connect the polar mount support arm 1002 to the motor gear arrangement 1100. The solar collection assembly 900 can be operatively connected to support brackets 1104 and 1106. A motor 1108 in combination with a motor drive 1110 and a drive unit 1112 facilitate rotation of the solar collection assembly 900 about the polar mount support arm 1002. The solar collection assembly 900 can be fixed at the connector 1102 and the support brackets 1104 and 1106 and the solar collection assembly 900 can rotate about the polar mount support arm 1002, according to an aspect.

It should be noted that although the positioning device 1004 (of FIG. 10) and the motor gear arrangement 1100 are illustrated and described as separate components, it is to be appreciated that the disclosed aspects are not so limited. For example, in accordance with some aspects, the positioning device 1004 and motor gear arrangement 1100 (or motor 1108) are combined in a single assembly. This single assembly can provide connection of a solar collection assembly 900 to the polar mount support arm 1002 while facilitating alteration of the position of the solar collection assembly 900 with respect to ascension and declination in relation to the position of the sun or another energy source from which energy is to be captured. In accordance with other aspects, various combinations of motors and positioning devices can be utilized to provide positioning of solar collection assemblies and devices utilized to harness the capture of radiation and the like while facilitating the adjustment of the position of the arrays and devices in relation to the energy source.

Figure 12:
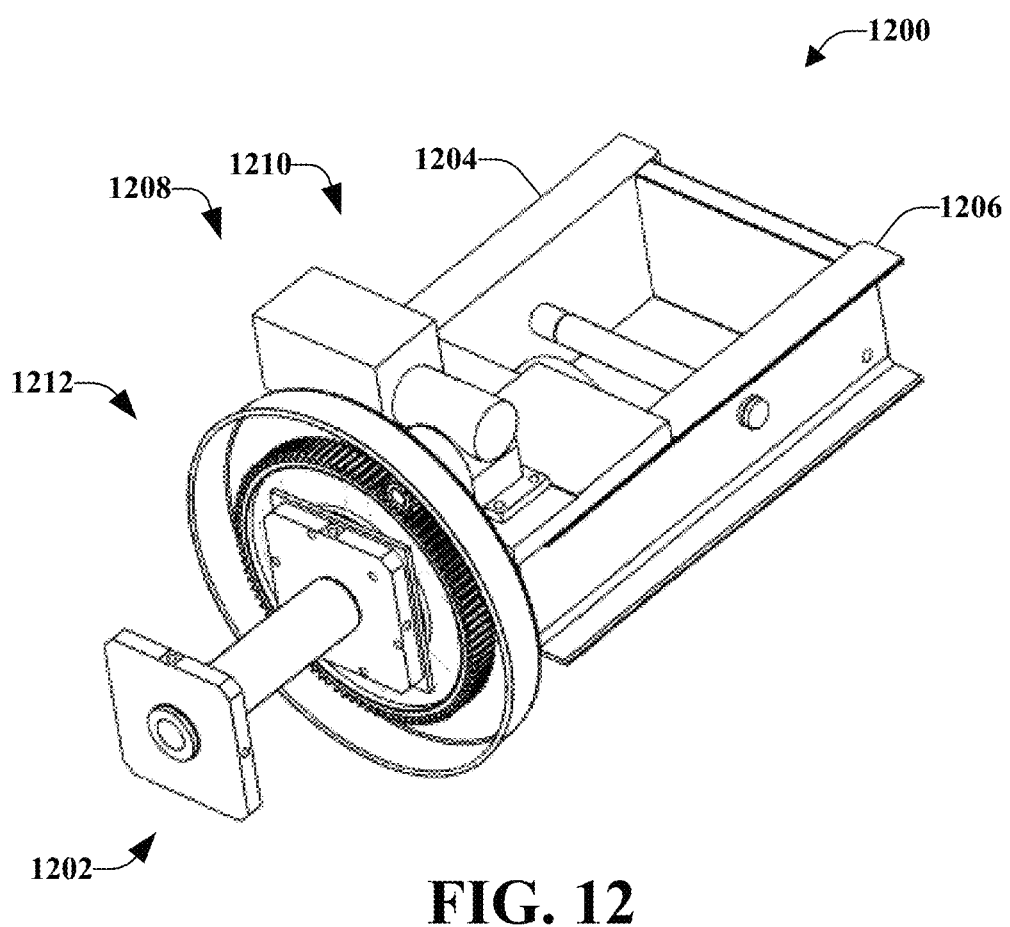
FIG. 12 illustrates another example motor gear arrangement that can be utilized for rotation control, according to an aspect.

FIG. 12 illustrates another example motor gear arrangement 1200 that can be utilized for rotation control, according to an aspect. As illustrated, motor gear arrangement 1200 includes a polar mount support arm 1202. Also included are brackets 1204 and 1206. Gear arrangement 1200 also includes a motor 1208 and a motor drive 1210. Further, gear arrangement 1200 includes a drive unit 1212.

Figure 13:
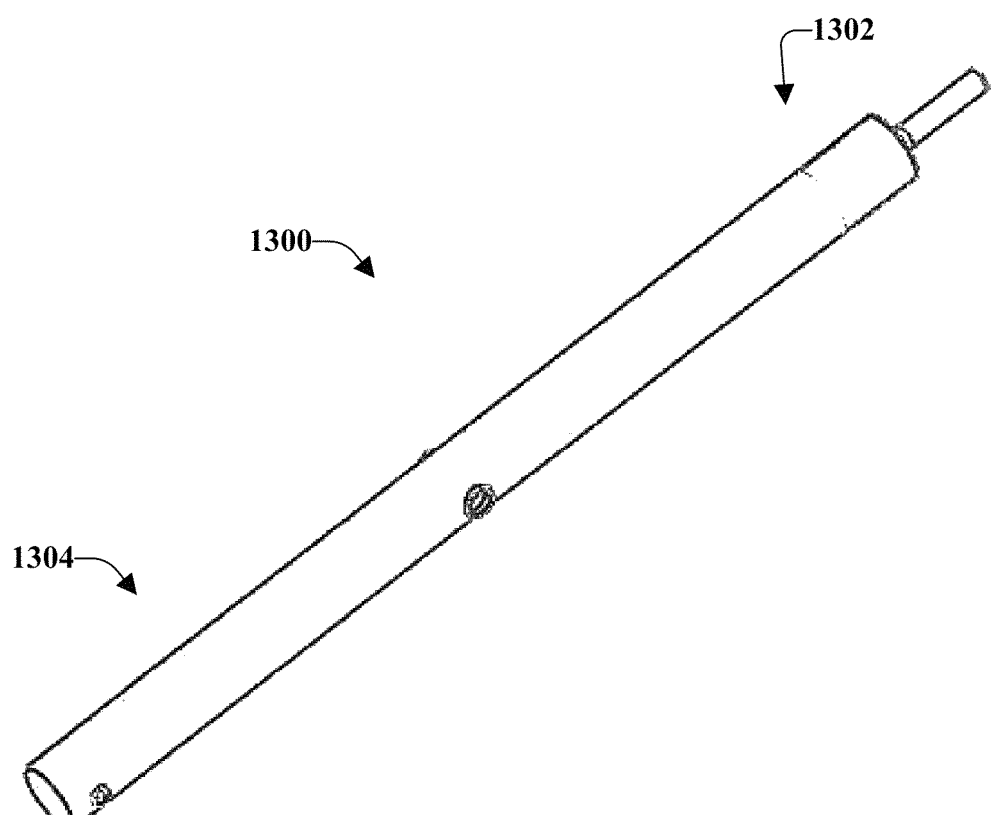
FIG. 13 illustrates a polar mounting pole that can be utilized with the disclosed aspects.

FIG. 13 illustrates an example polar mounting pole 1300 that can be utilized with the disclosed aspects. Polar mounting pole 1300 includes a first end 1302 that can be operatively connected to motor gear arrangement 1100 (of FIG. 11) or motor gear arrangement 1200 (of FIG. 12). A second end 1304 of polar mounting pole 1300 can be operatively connected to a mounting unit (not shown). Polar mounting pole 1300 can facilitate movement of a solar collector, according to an aspect.

Figure 14:
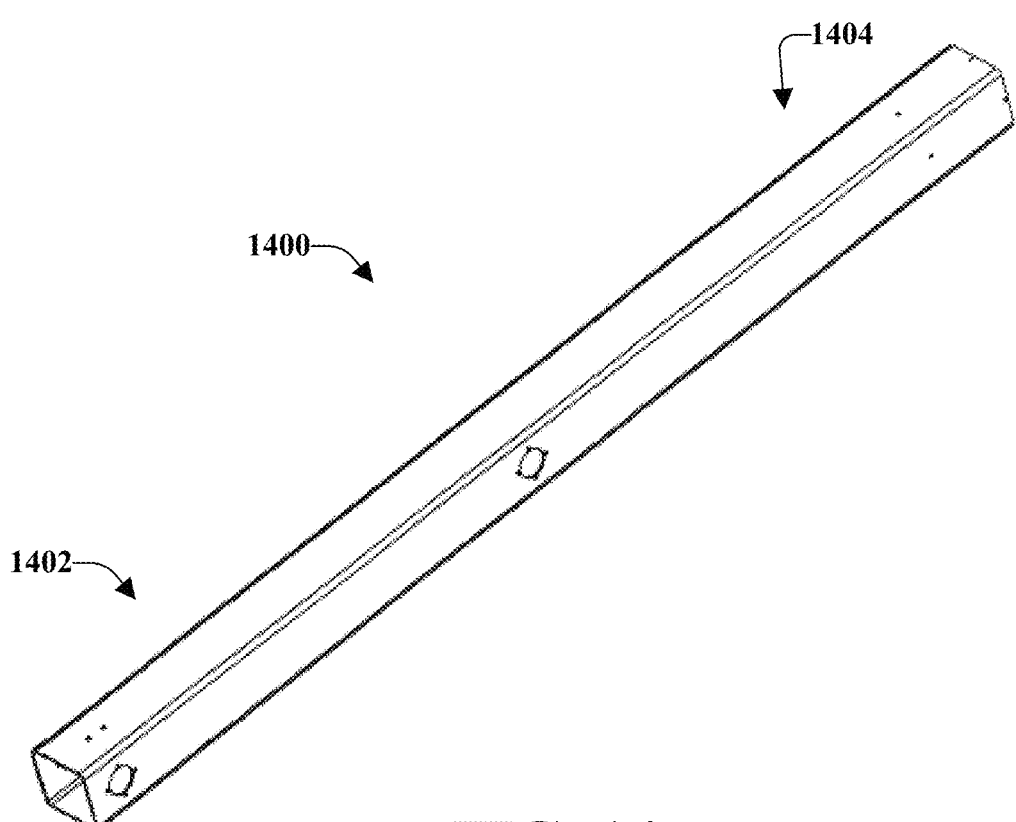
FIG. 14 illustrates another example of a polar mounting pole that can be utilized with the various aspects.
Figure 15:
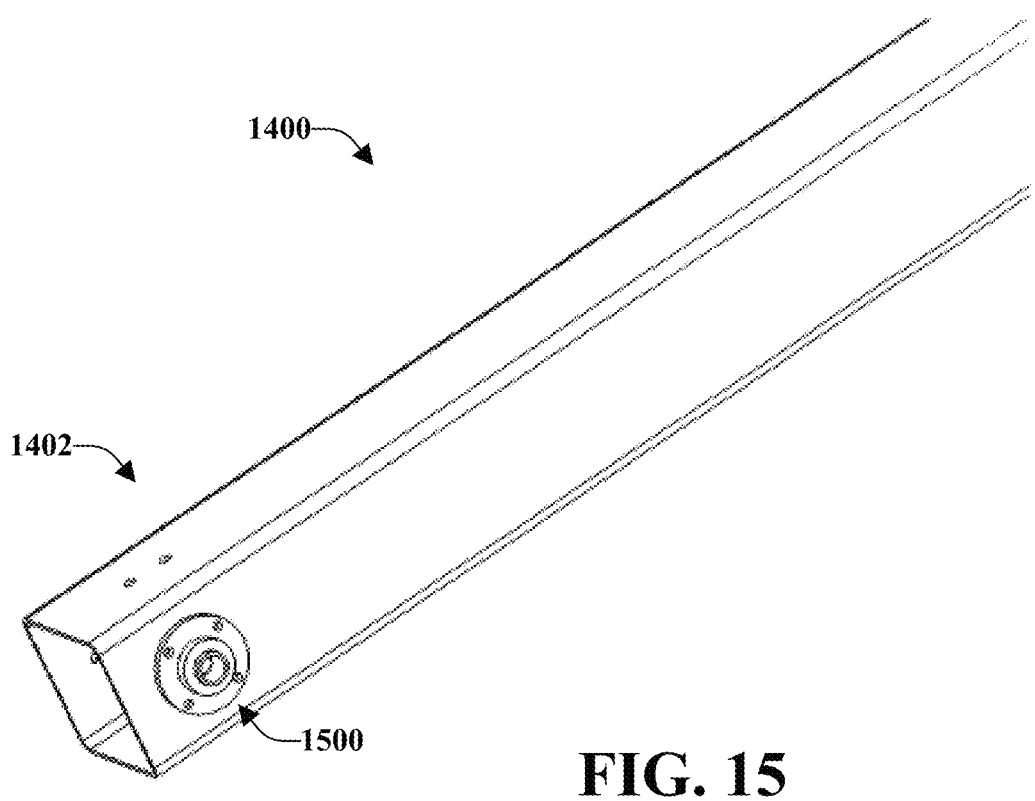
FIG. 15 illustrates a view of a first end of a polar mounting pole.

FIG. 14 illustrates another example of a polar mounting pole 1400 that can be utilized with the various aspects. Polar mounting pole 1400 includes a first end 1402 that can be operatively connected to motor gear arrangement 1100 and/or 1200. A second end 1404 of polar mounting pole 1400 can be operatively connected to a mounting unit (not shown). FIG. 15 illustrates a view of a first end 1402 of polar mounting pole 1400. As illustrated, motor gear arrangement 1100 and/or 1200 can be operatively attached to polar mounting pole 1400 though various connection means, such as illustrated connection means 1500.

Figure 16:
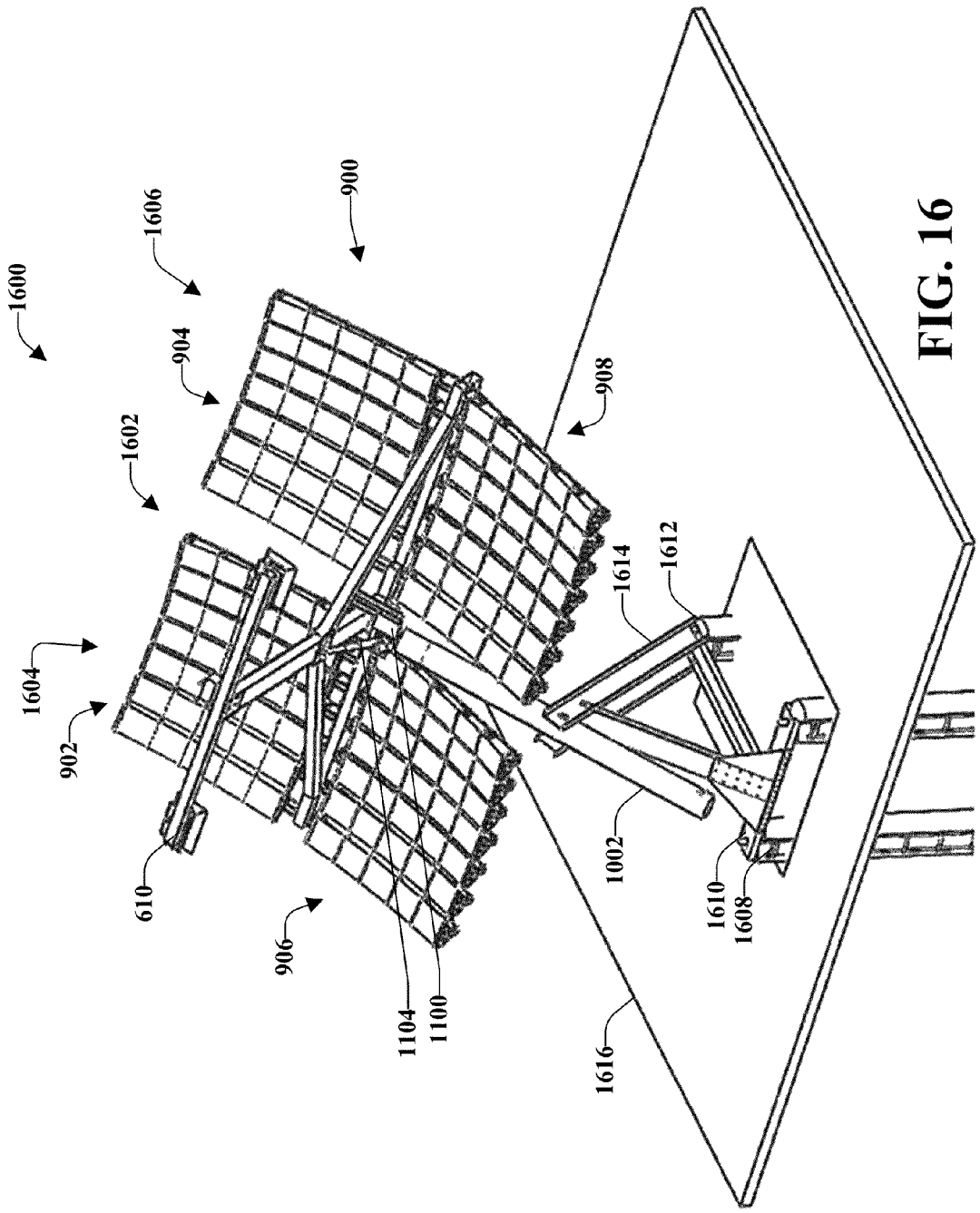
FIG. 16 illustrates a fully assembled solar collector assembly in an operating condition, according to an aspect.

FIG. 16 illustrates a fully assembled solar collector assembly 1600 in an operating condition, according to an aspect. The assembled solar collector assembly 1600 comprises solar collection assembly 900 that is aligned to reflect the sun's rays onto a central collection apparatus 610. The solar collection assembly 900 comprises a multitude of mirrors, which can be utilized to concentrate and focus solar radiation on the central collection apparatus 610. The mirrors can be included as part of solar wing assemblies that are combined to form solar arrays, as illustrated by array 902, array 904, array 906, and array 908.

The central collection apparatus 610 can comprise photovoltaic cells that are utilized to facilitate the transformation of solar energy to electrical energy. The solar collection assembly 900 and the central collection apparatus 610 are supported on polar mount support arm 1002. Further, the arrays 902, 904, 906, and 908 can be arranged so that a gap 1602 separates the arrays 902, 904, 906, and 908 into two groups, such as a first group 1604 (comprising arrays 902 and 906) and a second group 1606 (comprising arrays 904 and 908).

Figure 17:
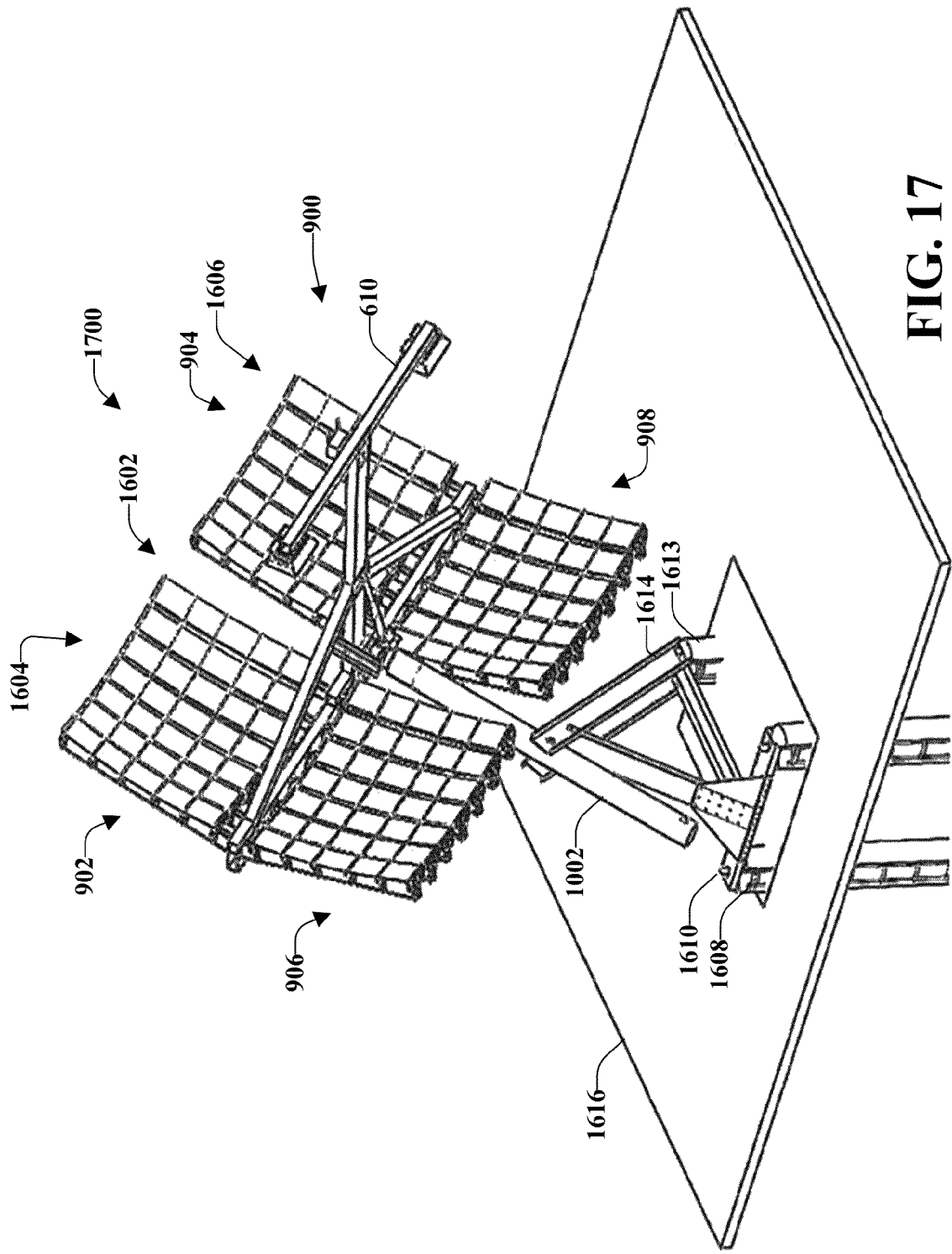
FIG. 17 illustrates a schematic representation of a solar collector assembly in a tilted position, according to an aspect.

To facilitate harnessing energy from the sun's rays (or other light source), the solar collection assembly 900 can be rotated in various planes to correctly align the mirrors of each array 902, 904, 906, and 908 with respect to the direction of the sun, reflecting the sun's rays (or other light source) onto the central collection apparatus 610. FIG. 17 illustrates a schematic representation 1700 of a solar collection assembly 900 in a tilted position, according to an aspect.

With reference now to both FIGS. 16 and 17, in accordance with some aspects, a motorized gear assembly can connect the solar collection assembly 900 and the central collection apparatus 610 to a polar mount support arm 1002. The polar mount support arm 1002 is aligned to the earth's surface such that it is aligned parallel with the tilt of the earth's axis of rotation. The motor gear arrangement 1100 can allow the solar collection assembly 900 and central collection apparatus 610 to be rotated about a horizontal axis, which is also known as the ascension axis. The solar collection assembly 900 and central collection apparatus 610 are further connected to the polar mount support arm 1002 by positioning device 1004. The positioning device 1004 allows the solar collection assembly 900 and central collection apparatus 610 to be rotated about a vertical axis (also known as the declination axis). Rotating the solar collection assembly 900 changes an orientation of arrays (e.g., operating position, safety position, or any position there between).

When the solar collector assembly 1600 is to be assembled in the field (e.g., in an operating location), the polar mount support arm 1002 is operatively connected to a footer 1608. Attached to the footer 1608 can be mounting brackets 1610 that allow the polar mount support arm 1002 to be selectively disengaged (at least partially) from the footer 1608 (e.g., for tilting and lowering of the solar collector assembly 1600). Another footer 1612 can have thereon a mounting unit 1614 to which the solar collector assembly 1600 is attached. It should be understood that the footers 1608 and 1612 extend below a surface 1616 (e.g., ground, earth) at a proper depth to anchor the solar collector assembly 1600.

Figure 18:
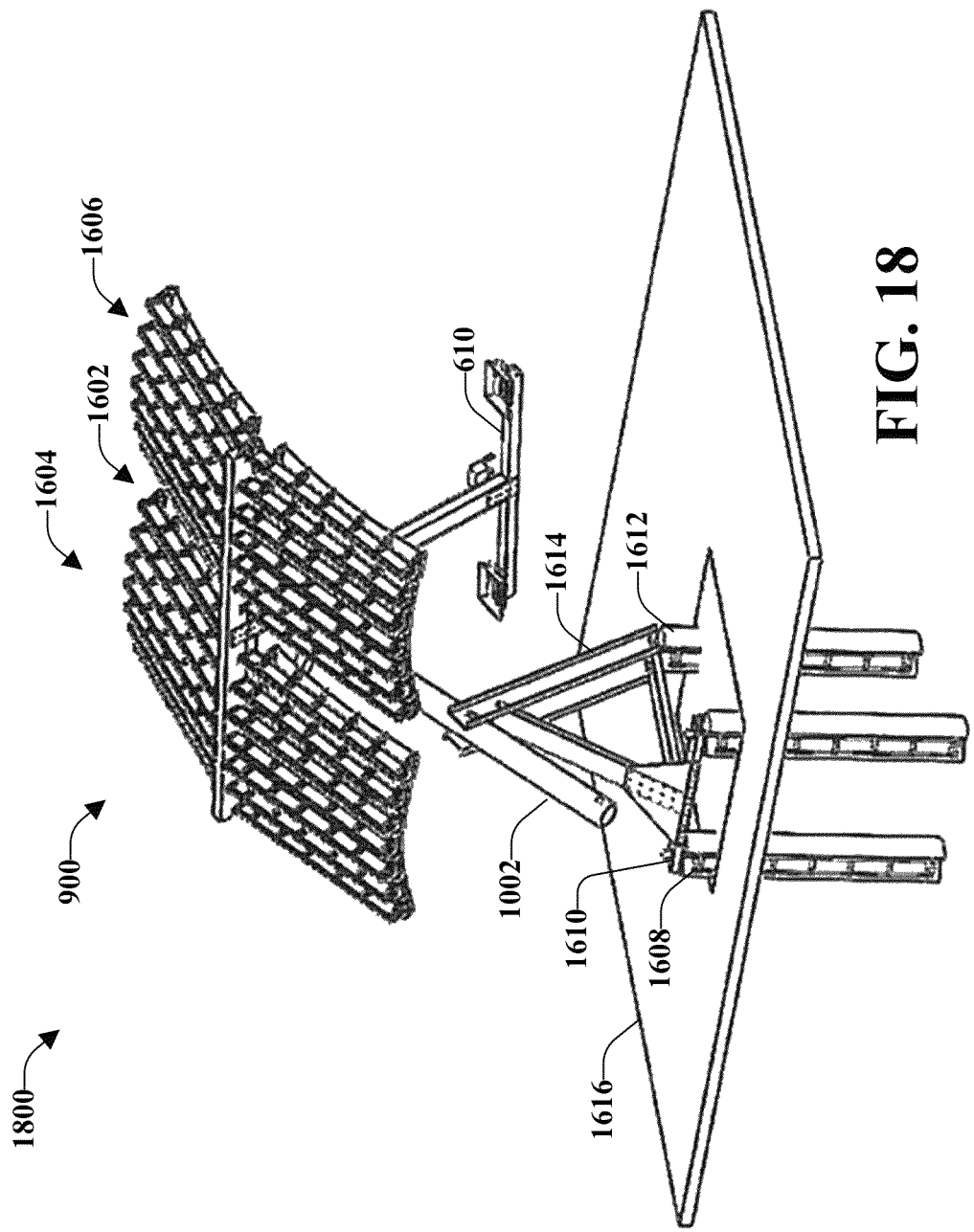
FIG. 18 illustrates a schematic representation of a solar collector assembly rotated in an orientation that is substantially different from an operating condition, according to aspect.

With reference now to FIG. 18, illustrated is a schematic representation 1800 of a solar collection assembly 900 rotated in an orientation that is substantially different from an operating condition, according to aspect. Rotating the solar collection assembly 900 in such a manner allows for service and maintenance to be performed on the receivers.

If the solar collection assembly 900 is to be placed in a position for storage, safety, or for maintenance purposes, such as the position illustrated in FIG. 18, the motor can be stepped through a number of steps to move the array from an operating position (e.g., the position illustrated in FIG. 16) to the position illustrated in FIG. 18, sometimes referred to as a storage or safety position. Further to this example, the number of steps utilized by motor to move the solar collection assembly 900 in a clockwise direction from an operating position to a storage position can be determined, along with the requisite number of steps in the counter-clockwise direction. The two counts (e.g., clockwise direction and counter-clockwise direction) can be compared and the shortest direction can be utilized to place the array in the storage position.

In another aspect, in response to a hailstorm the solar collection assembly 900 can be placed in the safety position. A record of the number of steps required to position the array in the safety position from the operating position of the array (e.g., its position prior to the command to move to the safety position was received) can be determined. After the hailstorm (or other danger) has passed, the array can be repositioned to resume operation. The repositioning can be determined based upon the last known position of the array plus the number of steps required to compensate for the current position of the sun (e.g., last position of array prior to the hailstorm plus the number of steps to move the array to current position of the sun). The current position of the sun can be determined by the use of latitude, longitude, date, and/or time information associated with the array and the position of the array. The current position of the sun can also be determined by the use of sun position sensors, which can be used to determine the angle at which the energy of sunlight is strongest and position the array accordingly.

Further, the gap 1602 in the groups of arrays 1604, 1606 allows the arrays to be positioned to minimize susceptibility of the mirrors that form the array to environmental damage such as strong winds and hail. As depicted in FIG. 17, the solar collection assembly 900 can be rotated about the polar mount support arm 1002, to place the array in a "safety position". The ability to rotate the solar collection assembly 900 about an ascension axis and tilt about the declination axis allows the solar collection assembly 900 to be positioned so that its alignment with any prevailing wind minimizes a sail effect of the solar collection assembly 900 in the wind. Also, in the event of hail strikes, snow, and so forth, the solar collection assembly 900 can be positioned such that the mirrors are facing downwards with the backside of the array structure being exposed to the hail strikes, mitigating damage to the mirrors.

In accordance with some aspects, the solar collection assembly 900 can utilize an electronic device, such as a computer operable to execute the positioning (e.g., tilting, rotating, etc.) of the solar collection assembly 900. For example, sensors located on or near the solar collection assembly 900 can sense weather conditions and automatically place the solar collection assembly 900 into a safety position. A multitude of solar collection assemblies located in a geographic area can utilize a common electronic device that is configured to control the movement of the multitude of solar collection assemblies. Further, the one or more electronic devices can intelligently operate the solar collection assemblies in order to mitigate damage to the devices.

For example, various aspects (e.g., in connection with sensing adverse operating conditions, detecting movement of the sun and so forth) can employ various machine learning schemes (e.g., artificial intelligence, rules based logic, and so forth) for carrying out various aspects thereof. For example, a process for determining if the solar collection assemblies should be placed in a safety position can be facilitated through an automatic classifier system and process. The machine learning schemes can measure various weather conditions, such as from a central collection device. In accordance with some aspects, the machine learning component can communicate (e.g., wirelessly) with various weather command centers (e.g., over the Internet) to obtain weather conditions.

Artificial intelligence based systems (e.g., explicitly and/or implicitly trained classifiers) can be employed in connection with performing inference and/or probabilistic determinations and/or statistical-based determinations as in accordance with one or more aspects as described herein. As used herein, the term "inference" refers generally to the process of reasoning about or inferring states of the system, environment, and/or user from a set of observations as captured through events, sensors, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the disclosed aspects. Further information relating to electronic devices that can be utilized with the disclosed aspects will be provided below.

Figure 19:
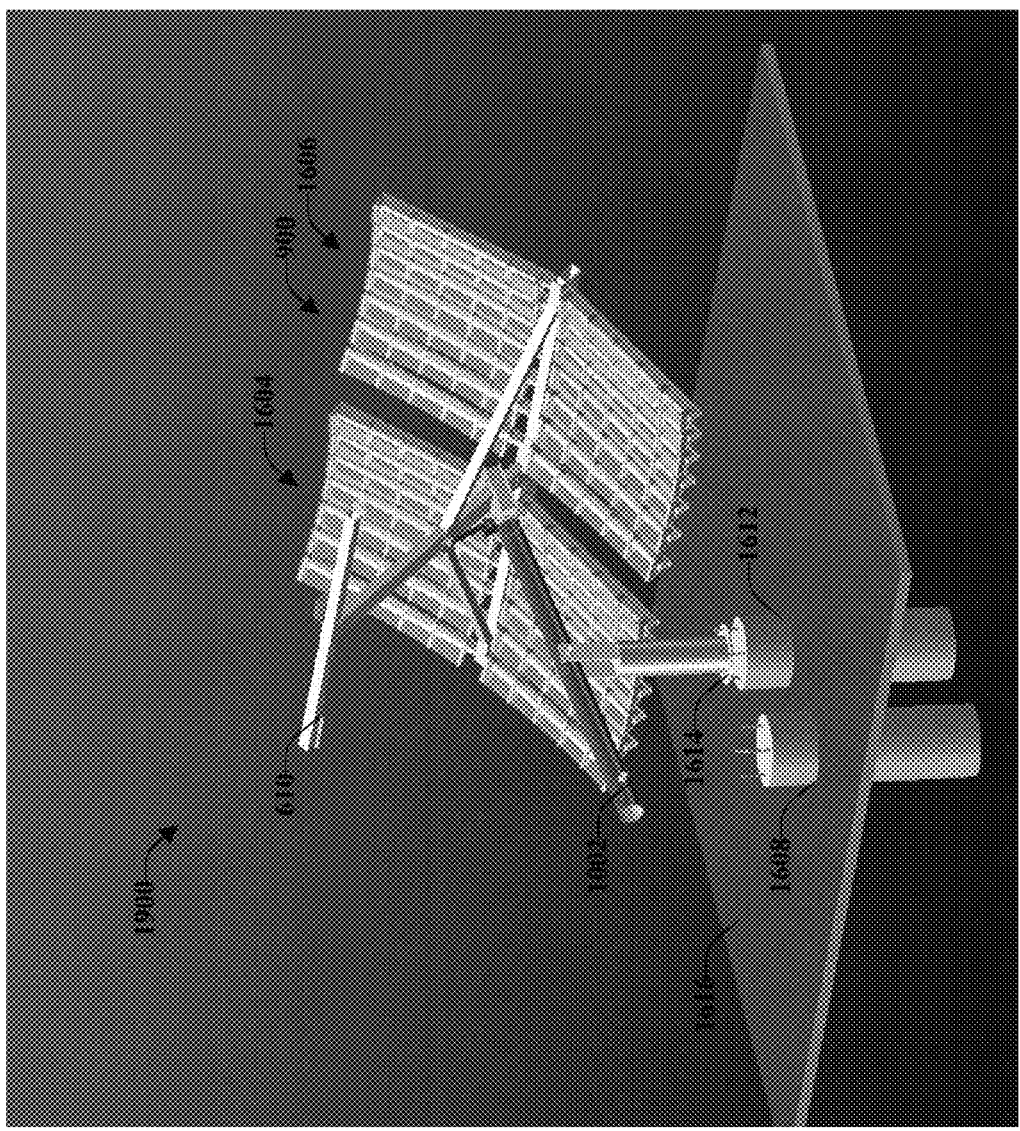
FIG. 19 illustrates a solar collector assembly rotated and lowered in accordance with the various aspects presented herein.

FIG. 19 illustrates a solar collector assembly 1900 rotated and lowered in accordance with the various aspects presented herein. Lowering the solar collector assembly allows for easy service, maintenance, and repair. Further, lowering the solar collector assembly 1900 can provide a safe storage position for severe weather. Rotation of the array solar collection assembly 900 about the ascension axis and the declination axis can enable all areas of the solar collection assembly 900 to be brought within easy reach of an operator. The operator could be an installation engineer who needs access to the various mirrors contained in the arrays, central collection apparatus 610, and so forth, during the installation process. For example, the installation engineer may need to access the central collection apparatus 610 for alignment purposes. The operator could also be a maintenance engineer who requires access to the solar collection assembly 900 to clean the mirrors, replace a mirror, and other functions.

The polar mount support arm 1002 (and possibly also the mounting brackets) can be disengaged from the footer 1608. This allows the polar mount support arm 1002 to be pivoted on the mounting unit 1614 and, thus, the solar collection assembly 900 can be brought into closer contact with the ground 1616.

Figure 20:
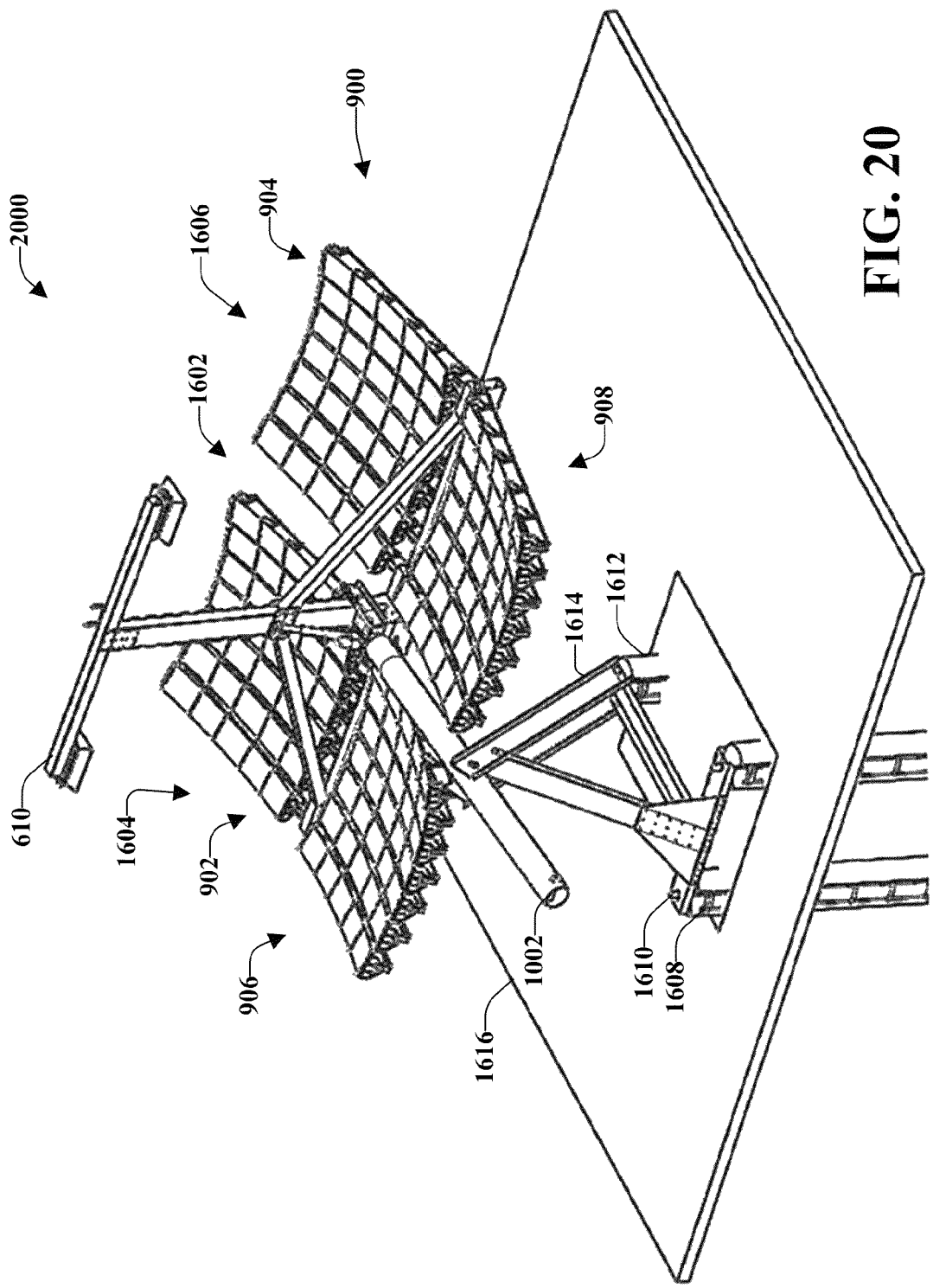
FIG. 20 illustrates a schematic representation of a solar collector assembly in a lowered position, according to an aspect.
Figure 21:
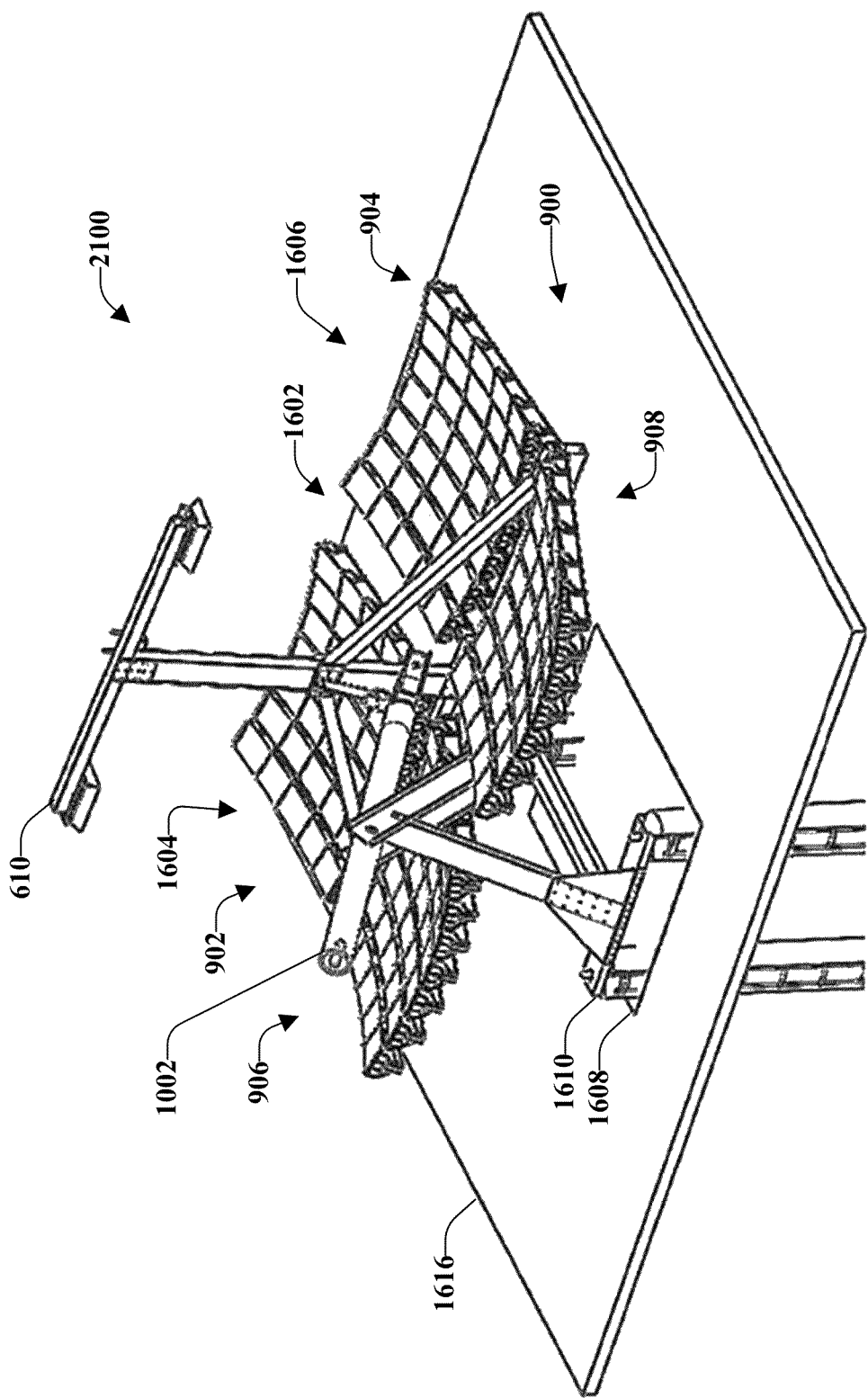
FIG. 21 illustrates a schematic representation of a solar collector assembly in a lowest position, which can be a storage position, according to an aspect.

FIG. 20 illustrates a schematic representation 2000 of a solar collection assembly 900 in a lowered position, according to an aspect and FIG. 21 illustrates a schematic representation 2100 of a solar collection assembly 900 in a lowest position, which can be a storage position, according to an aspect.

Figure 22:
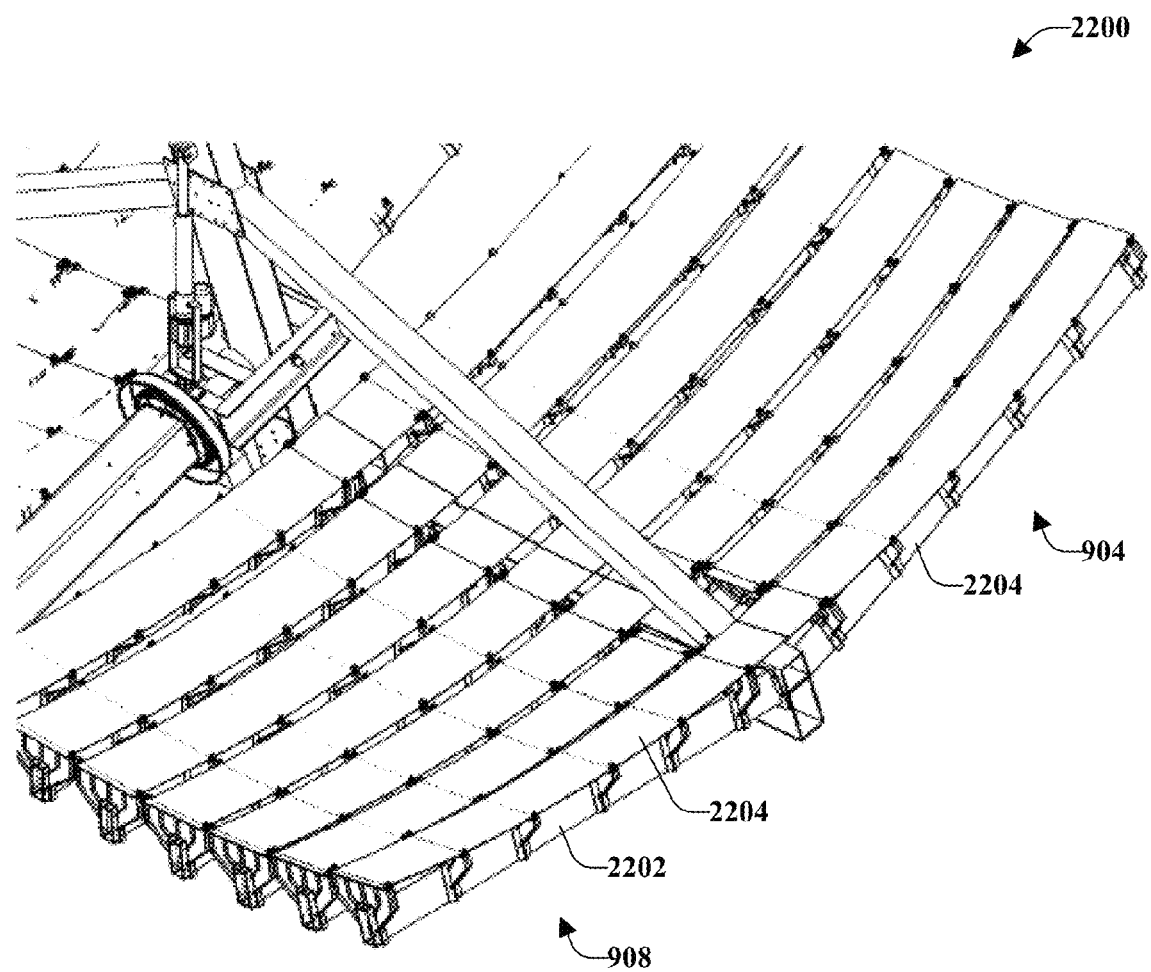
FIG. 22 illustrates another solar collection assembly that can be utilized with the disclosed aspects.

FIG. 22 illustrates another solar collection assembly 2200 that can be utilized with the disclosed aspects. In accordance with this aspect, solar collection assembly 2200 includes solar wing assemblies 2202 that utilize a single mirror 2204. As discussed with respect to the above aspects, each wing array 904, 906 has wing assemblies that comprise a separate mirror for each wing assembly. In this alterative aspect, a single mirror 2204 is utilized in place of the two separate mirrors. The single mirror 2204 extends across two wings 2202 and 2206 on opposite sides of the dish or solar collection assembly 2200. Utilizing a single mirror 2204 can increase the reflective area of the mirror array. The single mirror 2204 can be attached to the wings 2202 and 2206 through various techniques (e.g., sliding the mirror along the length of the wings 2202 and 2206, manually attaching the mirror at each mirror support rib, or through other techniques).

Figure 23:
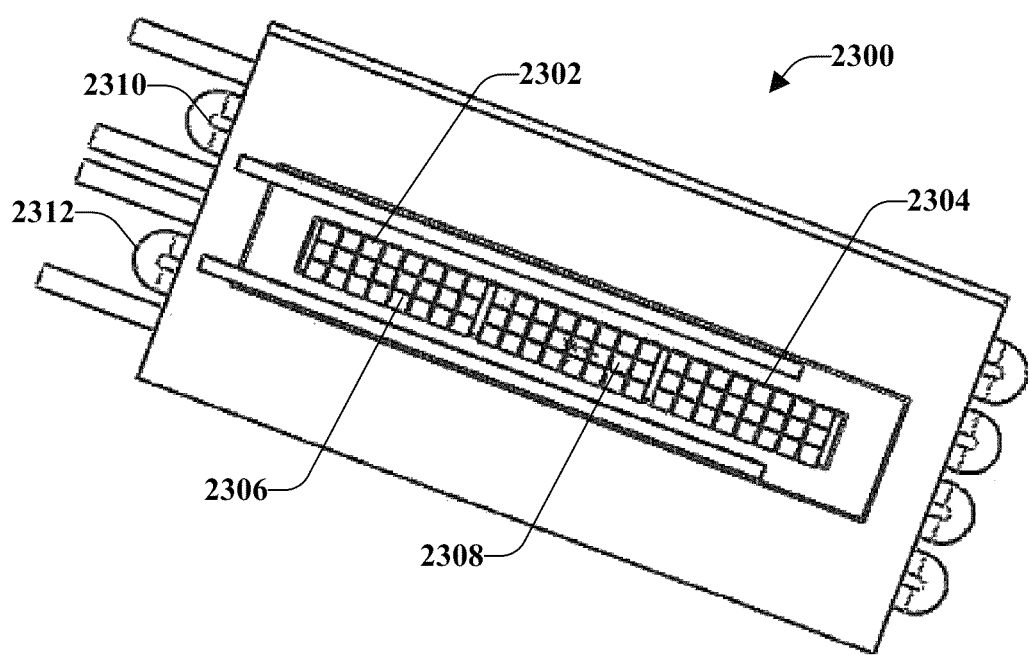
FIG. 23 illustrates an example receiver that can be utilized with the disclosed aspects.
Figure 24:
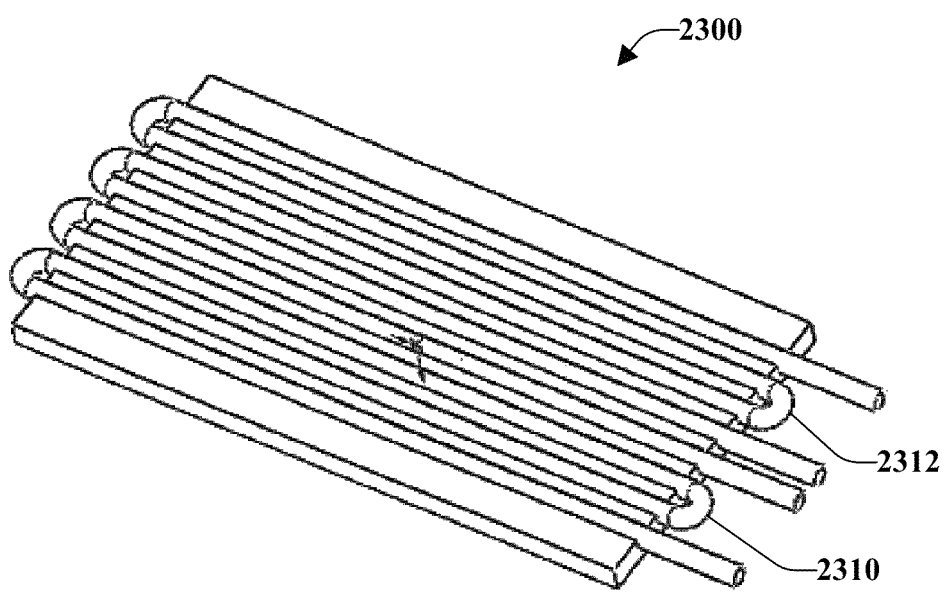
FIG. 24 illustrates an alternative view of the example receiver illustrated in FIG. 23, according to an aspect.

FIG. 23 illustrates an example receiver 2300 that can be utilized with the disclosed aspects. As illustrated the example receiver 2300 can be arranged with modules of photovoltaic cells, a few of which are labeled at 2302, 2304, and 2306. Also provided can be cooling lines 2308 and 2310 that can be utilized for heat collection. In accordance with some aspects, this heat can be utilized for a multitude of purposes. FIG. 24 illustrates an alternative view of the example receiver 2300 illustrated in FIG. 23, according to an aspect. The view in FIG. 24 illustrates how the cooling lines 2308 and 2310 can extend the length of the receiver 2300. The cooling lines 2308 and 2310 can have coolant therein in order to cool the photovoltaic cells (e.g., operate as a heat exchanger). It should be understood that the various exemplary devices disclosed herein (e.g., receiver 1300, motor gear arrangement 1100, and so forth) are for example purposes only and the disclosed aspects are not limited to these examples.

Methodologies that may be implemented in accordance with the disclosed aspects will be better appreciated with reference to the following flow charts. While, for purposes of simplicity of explanation, the methodologies are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component, and the like). Those skilled in the art will understand and appreciate that a methodology could alternatively be represented as a series of interrelated states or events, such as in a state diagram.

According to an aspect is a method of erecting a solar collector assembly. Method includes attaching a plurality of arrays to a backbone structure. Each of the plurality of arrays is attached to the backbone structure to maintain a spatial distance from each of the other plurality of arrays. Further, the plurality of arrays comprise at least one reflective surface. According to some aspects, method includes attaching the plurality of arrays such that the plurality of arrays rotate through a vertical axis as a function of the spatial distance. Method can also include connecting the backbone structure to a polar mount that is positioned at or near a center of gravity and attaching the polar mount to a fixed mounting and a movable mounting that enables lowering of the solar collector assembly. According to some aspects, method includes disengaging the polar mount from the movable mounting to lower the solar collector assembly. In accordance with some aspects, method includes rotating the plurality of arrays and the backbone structure around the center of gravity along the vertical axis to change an orientation of the plurality of arrays.

Alternatively or additionally, method can include rotating the plurality of arrays and the backbone structure around the center of gravity along the vertical axis to change one of an operating position, a safety position, or any position there between of the plurality of arrays. The plurality of arrays can be attached to the backbone structure at a same focus length. The solar collector assembly in transported in a partially assembled state, according to an aspect. In accordance with another aspect, the solar collector assembly in transported as modular units.

In accordance with some aspects, a method is provided for mass-producing solar collectors. Method includes forming a solar wing into a parabolic shape, the solar wing comprises a plurality of support ribs, attaching a reflective surface to the solar wing to create an assembly, and forming an array with a plurality of solar wing assemblies. Further, method can include attaching the array to a backbone structure. The backbone structure can be equipped with a plurality of photovoltaic cells that are utilized to facilitate a transformation of solar energy to electrical energy. In accordance with some aspects, forming the solar wing into the parabolic shape, comprises attaching the plurality of support ribs to a support beam, a height of each support rib is selected to create the parabolic shape. According to some aspects, attaching the reflective surface to the solar wing comprises placing the reflective surface on the plurality of support ribs and securing the reflective surface to the plurality of support ribs. In an aspect, method includes transporting the produced solar collectors in a partially assembled state. In another aspect, method includes transporting the produced solar collectors as modular units.

Figure 25:
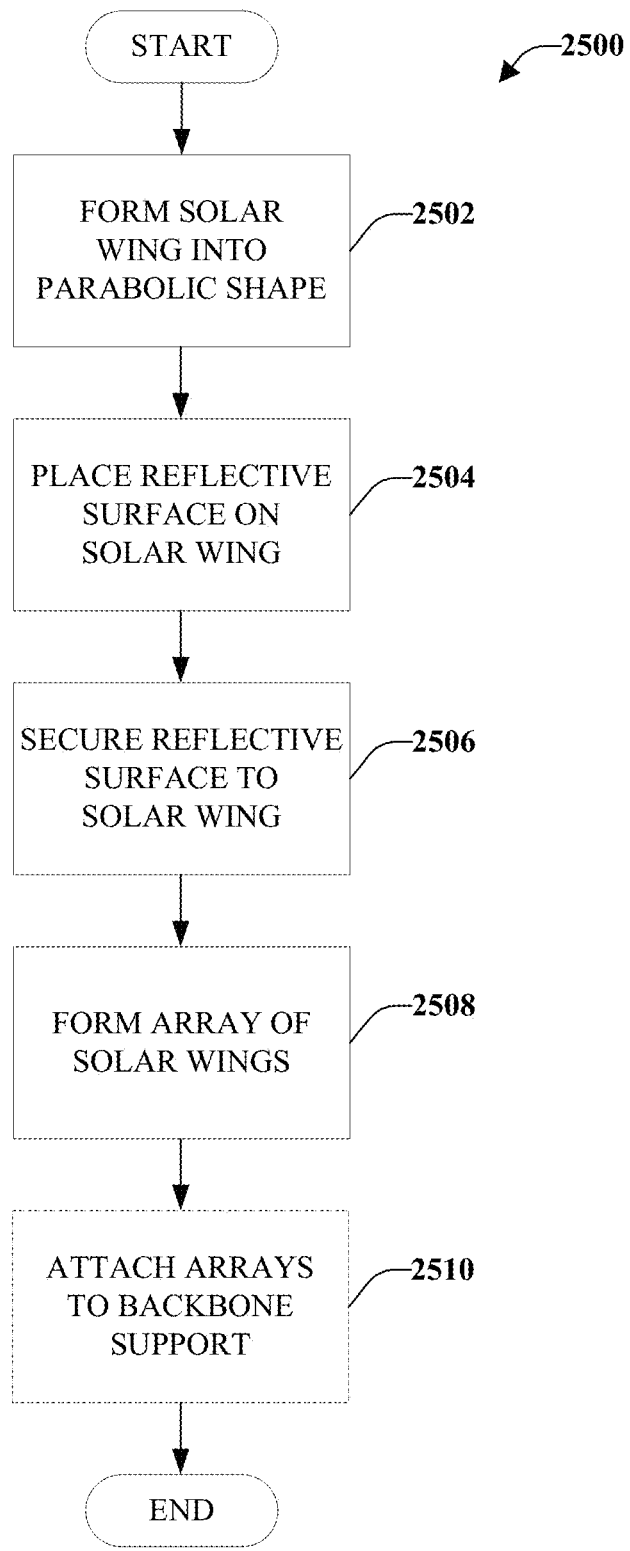
FIG. 25 illustrates a method for mass-producing solar collectors in accordance with one or more aspects.

FIG. 25 illustrates a method 2500 for mass-producing solar collectors in accordance with one or more aspects. Method 2500 can simplify production of solar collectors in an inexpensive manner. The aspects related to mass-producing the solar collectors can also facilitate less expensive costs for shipment of a large number of solar collectors (e.g., dishes). For example, the solar collectors can be composed of modular components, allowing for the shipment of these modular components. In accordance with some aspects, the solar collectors can be transported in a partially assembled state.

At 2502, a solar wing is formed into a parabolic shape. The solar wing can comprise a plurality of support ribs, which can be operatively connected to the support beam. The support ribs can be of various heights, wherein pairs of the support ribs have substantially the same height. The height of the support ribs is the height measured from the support beam to a mirror contact surface (e.g., the end of the support rib opposite the support beam). The heights of the support ribs at a middle of the support beam can be shorter than the height of the support ribs at the ends of the support beam, thus forming the mirror into a parabolic shape. A height of each support rib is selected to create the parabolic shape.

A reflective surface (e.g., mirror) is attached on the solar wing to create an assembly, at 2504. This can include placing the reflective surface on the plurality of support ribs (or on a contact surface associated with each support rib) and securing the reflective surface to the plurality of support rights. An increasing height of the support ribs (from the center outward) facilitates forming the reflective surface into the parabolic shape. At 2506, a fastening means is utilized to attach the reflective surface to the solar wing. For example, the fastening means can be placed on top of the reflective surface and secured to an associated support rib. Two fastening means can be utilized for each support rib. The fastening means holds the reflective surface against the support ribs to mitigate the amount of movement of the reflective surface.

In accordance with some aspects, the fastening means can be hooks located at each end of a solar wing assembly. The hooks can function as stops to prevent a mirror, which is slid in place, from disengaging from the solar wing assembly. In accordance with this aspect, attaching the reflective surface to the solar wing includes sliding the reflective surface over the plurality of support ribs and under the mirror support clips and securing the reflective surface at both ends of the solar wing. In an example, the mirrors can be end loaded, similar to a windshield wiper blade refill. The wing can have a stopper clip on the end closest to the beam and the mirror slides between the clips to form the shape. A second set of stopper clips can be attached to secure the mirrors.

A multitude of solar wings are combined, at 2508, to form an array of solar wings. Any number of solar wings can be utilized to form the array. In accordance with some aspects, seven solar wings are utilized to form an array; however, more or fewer solar wings can be utilized. The solar wings can be arranged into the array such that the solar wings are at a similar focus length as receivers.

In accordance with some aspects, the arrays are connected to a backbone structure, at 2510. Method 2500 can also include equipping the backbone structure with a plurality of photovoltaic cells that can be utilized to facilitate a transformation of solar energy to electrical energy. Attaching the arrays to the backbone structure is optional and the arrays can be connected to the backbone structure after transport (e.g., in the field). The solar collectors can be transported in a partially assembled state or as modular units.

According to some aspects, method 2500 can include transporting the produced solar collectors in a partially assembled state. According to other aspects, method 2500 includes transporting the produced solar collectors as modular units.

Figure 26:
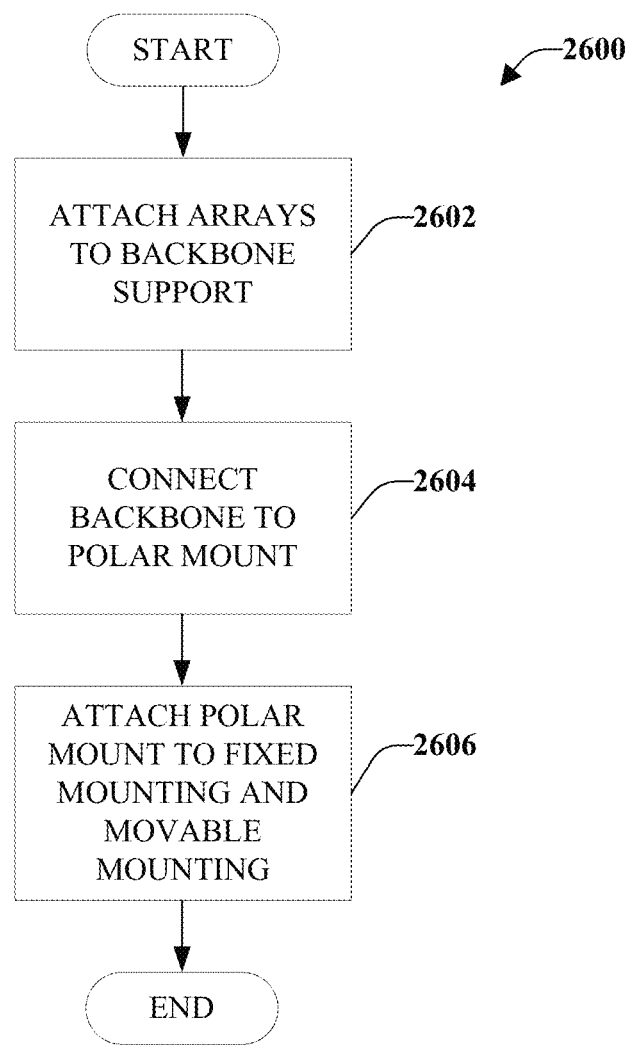
FIG. 26 illustrates a method for erecting a solar collector assembly, according to an aspect.

FIG. 26 illustrates a method 2600 for erecting a solar collector assembly, according to an aspect. The solar collector assembly can be assembled so that the assembly can be rotated, tilted, and lowered for various purposes (e.g., construction, maintenance, service, safety, and so forth). Assembly of the collector is possible without the assistance of a crane. Further, once assembled, no further alignment of the panels is needed.

At 2602, a plurality of arrays are attached to a backbone support. The arrays can comprise a multitude of solar wings. However, in accordance with some aspects, the arrays can be constructed from a single solar wing. The plurality of arrays can comprise at least one reflective surface.

The arrays are attached to the backbone support to maintain a spatial distance from each of the other plurality of arrays. This spatial distance can mitigate the effect wind forces can have during periods of high winds. The arrays are also mounted to allow slight movement and flexibility while keeping rigidity to maintain the focus of sunlight on the receivers. In accordance with some aspects, the arrays are arranged as a trough design instead of being placed at a similar focal distance from a receiver. According to some aspects, the spatial distance allows the plurality of arrays to rotate through a vertical axis.

A backbone is connected to a polar mount, at 2604. The polar mount can be positioned at or near a center of gravity of the solar collector, which can allow movement (e.g., tilt, rotate, lower) of the collector for ease of usage, service, storage, or the like. In accordance with some aspects, the plurality of arrays are attached to the backbone structure at a same focus length.

The polar mount is attached to a fixed mounting and a movable mounting, at 2604. The polar mount can be selectively removed from the movable mounting to allow the solar collector to be lowered for service, repair, or for other purposes.

Additionally, method 2600 can include rotating the plurality of arrays and the backbone structure around a center of gravity along the vertical axis to change an orientation of the plurality of arrays. The orientation can be one of an operating position or a safety position. Alternatively or additionally, method 2600 can include disengaging the polar mount from the movable mounting the lower the solar collector assembly.

Figure 27:
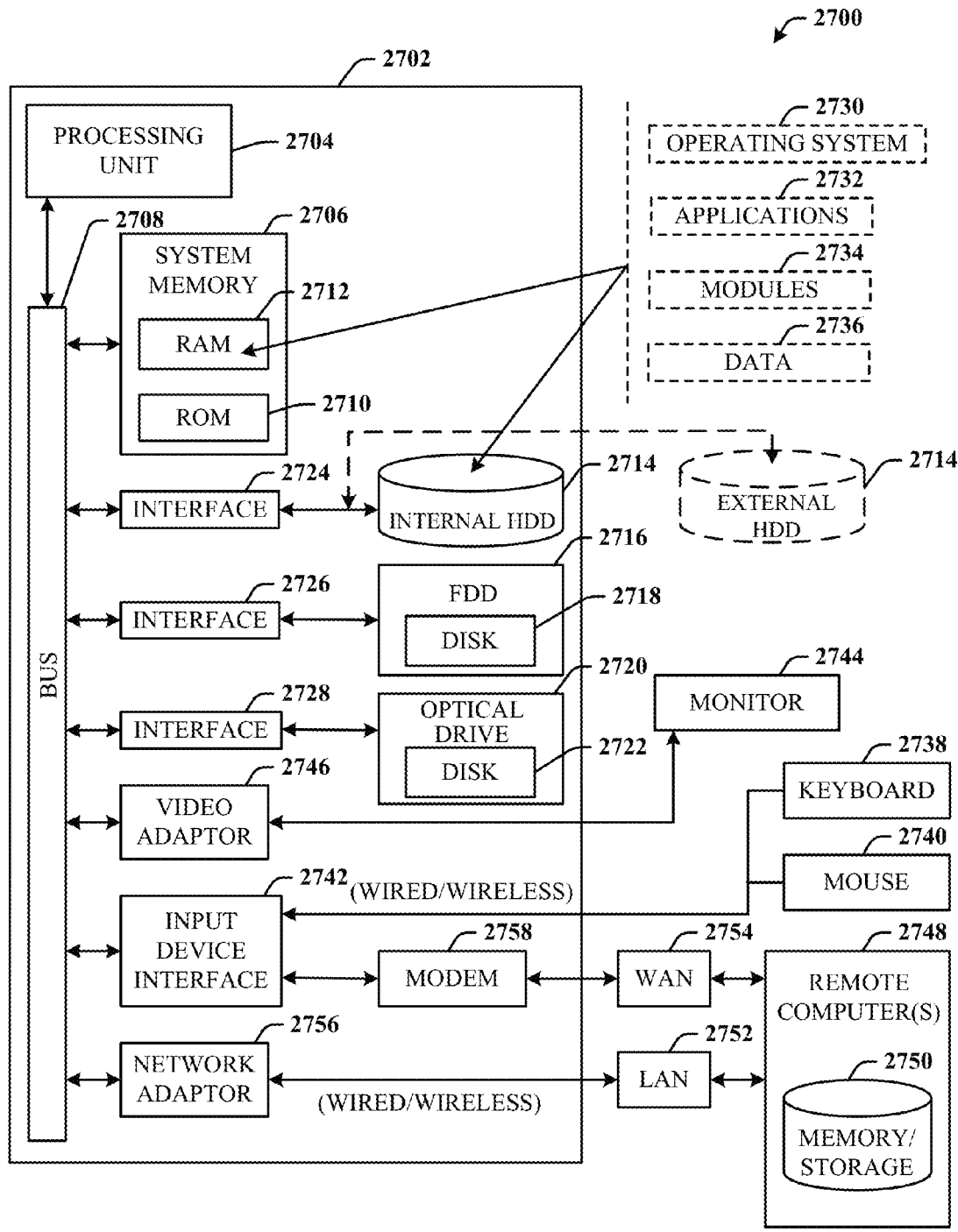
FIG. 27 illustrates a block diagram of a computer operable to be utilized with a solar collector, according to an aspect.

Referring now to FIG. 27, there is illustrated a block diagram of a computer operable to be utilized with a solar collector, according to an aspect. In order to provide additional context for various aspects disclosed herein (e.g., determining when to move a solar collector into a safety position, when to move the solar collector into an operating condition, and so forth), FIG. 27 and the following discussion are intended to provide a brief, general description of a suitable computing environment 2700 in which the various aspects can be implemented. While one or more aspects may be described in the general context of computer-executable instructions that may run on one or more computers, those skilled in the art will recognize that the various aspects also can be implemented in combination with other program modules and/or as a combination of hardware and software.

Generally, program modules include routines, programs, components, data structures, and so forth, that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices (e.g., remote weather collection devices) that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 27, the exemplary environment 2700 for implementing various aspects includes a computer 2702, the computer 2702 including a processing unit 2704, a system memory 2706 and a system bus 2708. The system bus 2708 couples system components including, but not limited to, the system memory 2706 to the processing unit 2704. The processing unit 2704 can be any of various commercially available processors. Dual microprocessors and other multi-processor architectures may also be employed as the processing unit 2704.

The system bus 2708 can be any of several types of bus structure that may further interconnect to a memory bus (with or without a memory controller), a peripheral bus, and a local bus using any of a variety of commercially available bus architectures. The system memory 2706 includes read-only memory (ROM) 2710 and random access memory (RAM) 2712. A basic input/output system (BIOS) is stored in a non-volatile memory 2710 such as ROM, EPROM, EEPROM, which BIOS contains the basic routines that help to transfer information between elements within the computer 2302, such as during start-up. The RAM 2312 can also include a high-speed RAM such as static RAM for caching data.

The computer 2702 further includes an internal hard disk drive (HDD) 2714 (e.g., EIDE, SATA), which internal hard disk drive 2714 may also be configured for external use in a suitable chassis (not shown), a magnetic floppy disk drive (FDD) 2716, (e.g., to read from or write to a removable diskette 2718) and an optical disk drive 2720, (e.g., reading a CD-ROM disk 2722 or, to read from or write to other high capacity optical media such as the DVD). The hard disk drive 2714, magnetic disk drive 2716 and optical disk drive 2720 can be connected to the system bus 2708 by a hard disk drive interface 2724, a magnetic disk drive interface 2726 and an optical drive interface 2728, respectively. The interface 2724 for external drive implementations includes at least one or both of Universal Serial Bus (USB) and IEEE 1394 interface technologies. Other external drive connection technologies are within contemplation of the one or more aspects.

The drives and their associated computer-readable media provide nonvolatile storage of data, data structures, computer-executable instructions, and so forth. For the computer 2702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 2712, including an operating system 2730, one or more application programs 2732, other program modules 2734 and program data 2736. All or portions of the operating system, applications, modules, and/or data can also be cached in the RAM 2712. It is appreciated that the various aspects can be implemented with various commercially available operating systems or combinations of operating systems.

An entity (e.g., user, another computer, and so forth) can enter commands (e.g., rotate, tilt, and so forth) and information into the computer 2702 through one or more wired/wireless input devices, e.g., a keyboard 2738 and a pointing device, such as a mouse 2740. Other input devices (not shown) may include a microphone, an IR remote control, a joystick, a game pad, a stylus pen, touch screen, or the like. These and other input devices are often connected to the processing unit 2704 through an input device interface 2742 that is coupled to the system bus 2708, but can be connected by other interfaces, such as a parallel port, an IEEE 1394 serial port, a game port, a USB port, an IR interface, etc.

A monitor 2744 or other type of display device is also connected to the system bus 2708 through an interface, such as a video adapter 2746. In addition to the monitor 2744, a computer typically includes other peripheral output devices (not shown), such as speakers, printers, etc.

The computer 2702 may operate in a networked environment using logical connections through wired and/or wireless communications to one or more remote computers, such as a remote computer(s) 2748. The remote computer(s) 2748 can be a workstation, a server computer, a router, a personal computer, portable computer, microprocessor-based entertainment appliance, a peer device or other common network node, and typically includes many or all of the elements described relative to the computer 2702, although, for purposes of brevity, only a memory/storage device 2750 is illustrated. The logical connections depicted include wired/wireless connectivity to a local area network (LAN) 2752 and/or larger networks, e.g., a wide area network (WAN) 2754. Such LAN and WAN networking environments are commonplace in offices and companies, and facilitate enterprise-wide computer networks, such as intranets, all of which may connect to a global communications network, e.g., the Internet.

When used in a LAN networking environment, the computer 2702 is connected to the local network 2752 through a wired and/or wireless communication network interface or adapter 2756. The adaptor 2756 may facilitate wired or wireless communication to the LAN 2752, which may also include a wireless access point disposed thereon for communicating with the wireless adaptor 2756.

When used in a WAN networking environment, the computer 2702 can include a modem 2758, or is connected to a communications server on the WAN 2754, or has other means for establishing communications over the WAN 2754, such as by way of the Internet. The modem 2758, which can be internal or external and a wired or wireless device, is connected to the system bus 2708 through the serial port interface 2742. In a networked environment, program modules depicted relative to the computer 2702, or portions thereof, can be stored in the remote memory/storage device 2750. It will be appreciated that the network connections shown are exemplary and other means of establishing a communications link between the computers can be used.

The computer 2702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 28:
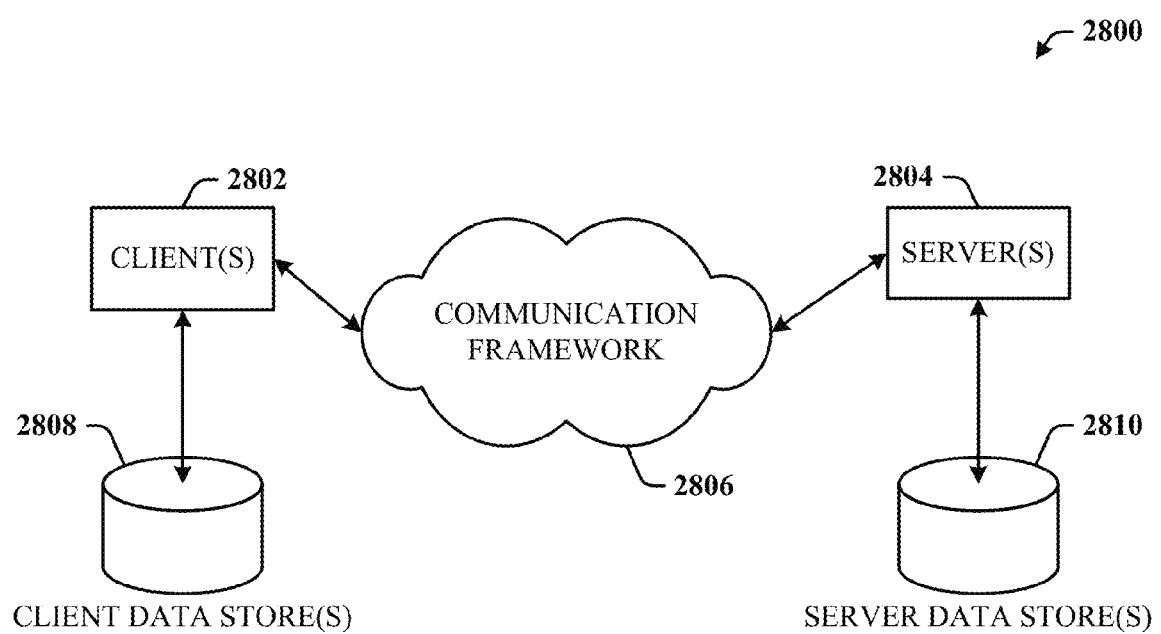
FIG. 28 illustrates a schematic block diagram of an exemplary computing environment in accordance with the various aspects.

Referring now to FIG. 28, there is illustrated a schematic block diagram of an exemplary computing environment 2800 in accordance with the various aspects. The system 2800 includes one or more client(s) 2802. The client(s) 2802 can be hardware and/or software (e.g., threads, processes, computing devices). The client(s) 2802 can house associated contextual information by employing the various aspects, for example.

The system 2800 also includes one or more server(s) 2804. The server(s) 2804 can also be hardware and/or software (e.g., threads, processes, computing devices). The servers 2804 can house threads to perform transformations by employing the various aspects, for example. One possible communication between a client 2802 and a server 2804 can be in the form of a data packet adapted to be transmitted between two or more computer processes. The data packet may include a cookie and/or associated contextual information, for example. The system 2800 includes a communication framework 2806 (e.g., a global communication network such as the Internet) that can be employed to facilitate communications between the client(s) 2802 and the server(s) 2804.

Communications can be facilitated through a wired (including optical fiber) and/or wireless technology. The client(s) 2802 are operatively connected to one or more client data store(s) 2808 that can be employed to store information local to the client(s) 2802 (e.g., cookie(s) and/or associated contextual information). Similarly, the server(s) 2804 are operatively connected to one or more server data store(s) 2810 that can be employed to store information local to the servers 2804.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." The term "or" as used in either the detailed description of the claims is meant to be a "non-exclusive or". The word "exemplary" as used herein to mean serving as an example, instance, or illustration. Any aspect or design described herein as "exemplary" is not necessarily to be construed as preferred or advantageous over other aspects or designs.

Furthermore, the one or more aspects may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

What is claimed is:

1. A method of erecting a solar collector assembly, comprising:
   attaching at least four arrays to a structure, wherein the at least four arrays comprise:
      a first array attached to a first surface of a first side of the structure;
      a second array attached to a second surface of the first side of the structure, the first surface and the second surface are located on opposite surfaces of the first side of the structure;
      a third array attached to a third surface of a second side of the structure; and
      at least a fourth array attached to a fourth surface of the second side of the structure, the third surface and the fourth surface are located on opposite surfaces of the second side of the structure,
      wherein a first opening is located between the first array and the third array and a second opening is located between the second array and the at least the fourth array, wherein each array comprises at least one reflective surface;
   connecting the structure and the at least four arrays to a mount that is positioned at or near a center of gravity, wherein the structure and the at least four arrays can be tilted, rotated, or lowered; and
   attaching the mount to a mount support arm, wherein the mount support arm is operatively connected to a footer that extends underground, wherein the mount support arm is removed from the footer and also passes through the first opening, and the solar collector can still rotate in a first direction and tilt in a second direction while the mount support arm passes through the first opening as the solar collector is lowered.

2. The method of claim 1, wherein attaching the at least four arrays comprises attaching the at least four arrays such that the at least four arrays rotate through a vertical axis or a declination axis.

3. The method of claim 2, further comprises rotating the at least four arrays and the structure around the center of gravity along the vertical axis or the declination axis to change an orientation of the at least four arrays.

4. The method of claim 3, wherein the rotating the at least four arrays and the structure comprises rotating the at least four arrays and the structure around the center of gravity along the vertical axis or the declination axis to change one of an operating position, a safety position, or any position there between of the plurality of arrays.

5. The method of claim 1, further comprises disengaging the mount from the movable mounting to lower the solar collector assembly.

6. The method of claim 1, wherein the attaching the at least four arrays to the structure comprises attaching the at least four arrays to the structure at a same focus length.

7. The method of claim 1, further comprises transporting the solar collector assembly in a partially assembled state or as modular units.

8. A solar collector, comprising:
at least four arrays attached to a support, wherein the at least four arrays comprise:
a first array attached to a first surface of a first side of the support;
a second array attached to a second surface of the first side of the support, the first surface and the second surface are located on opposite surfaces of the first side of the support;
a third array attached to a third surface of a second side of the support; and
at least a fourth array attached to a fourth surface of the second side of the support, the third surface and the fourth surface are located on opposite surfaces of the second side,
wherein a first opening is located between the first array and the third array and a second opening is located between the second array and the at least the fourth array, and wherein each array comprises at least one reflective surface;
a mount on which the support and the at least four arrays can be tilted, rotated, or lowered, wherein the mount is positioned at or near a center of gravity; and
a mount support arm to which the mount is operatively connected, the mount support arm is operatively connected to a footer that extends underground, wherein the mount support arm is detached disengaged from the footer and also passes through the first opening, and the solar collector can still rotate in a first direction and tilt in a second direction while the mount support arm passes through the first opening as the solar collector is lowered.

9. The solar collector of claim 8, further comprising a collection apparatus that comprises a plurality of photovoltaic cells that transform solar energy to electrical energy.

10. The solar collector of claim 8, wherein each of the at least four arrays comprise at least one solar wing, comprising:
a first pair of support ribs comprising a first height; and
a second pair of support ribs comprising a second height, wherein the first height and the second height are selected to form the at least one reflective surface into a parabolic shape.

11. The solar collector of claim 8, further comprising a positioning device that rotates the at least four arrays about a vertical axis or a declination axis.

12. The solar collector of claim 8, wherein the mount support arm is aligned parallel with the tilt of the earth's axis of rotation.

13. A solar collector, comprising:
at least four arrays attached to a support, wherein the at least four arrays comprise:
a first array attached to a first surface of a first side of the support;
a second array attached to a second surface of the first side of the support, the first surface and the second surface are located on opposite surfaces of the first side of the support;
a third array attached to a third surface of a second side of the support; and
at least a fourth array attached to a fourth surface of the second side of the support, the third surface and the fourth surface are located on opposite surfaces of the second side,
a mount on which the support and the at least four arrays can be tilted, rotated or lowered, the mount is positioned at or near a center of gravity;
a mount support arm to which the mount is operatively connected; and
wherein the mount support arm is operatively connected to a movable mount and a fixed mount, the mount support arm is disengaged from the fixed mount and also passes through a first opening located between the first array and the third array and the solar collector can still rotate in a first direction and tilt in a second direction as the solar collector is lowered.

14. The solar collector of claim 13, wherein a first opening is located between the first array and the third array and a second opening is located between the second array and the at least the fourth array, and wherein each array comprises at least one reflective surface.

15. The solar collector of claim 13, further comprising a collection apparatus that comprises a plurality of photovoltaic cells that transform solar energy to electrical energy.

16. The solar collector of claim 13, wherein each of the at least four arrays comprise at least one solar wing, comprising:
a first pair of support ribs comprising a first height; and
a second pair of support ribs comprising a second height, wherein the first height and the second height are selected to form at least one reflective surface into a parabolic shape.

17. The solar collector of claim 13, further comprising a positioning device that rotates the at least four arrays about a vertical axis or a declination axis.

18. The solar collector of claim 13, wherein the mount support arm is aligned parallel with the tilt of the earth's axis of rotation.

* * * * *